US011728989B2

(12) United States Patent
Mizuta

(10) Patent No.: US 11,728,989 B2
(45) Date of Patent: *Aug. 15, 2023

(54) INFORMATION COMMUNICATION SYSTEM FOR ESTABLISHING PAIRING IN INFORMATION COMMUNICATION NETWORK

(71) Applicant: PLATFIELD INC., Takarazuka (JP)

(72) Inventor: Takeshi Mizuta, Takarazuka (JP)

(73) Assignee: PLATFIELD INC., Takarazuka (JP)

( * ) Notice: Subject to any disclaimer, the term of this patent is extended or adjusted under 35 U.S.C. 154(b) by 293 days.

This patent is subject to a terminal disclaimer.

(21) Appl. No.: 16/567,248

(22) Filed: Sep. 11, 2019

(65) Prior Publication Data

US 2020/0007330 A1    Jan. 2, 2020

Related U.S. Application Data

(62) Division of application No. 15/429,351, filed on Feb. 10, 2017, now Pat. No. 10,454,682.

(30) Foreign Application Priority Data

Oct. 21, 2016 (JP) ................................. 2016-206439

(51) Int. Cl.
*H04L 9/32* (2006.01)
*H04L 9/40* (2022.01)
(Continued)

(52) U.S. Cl.
CPC .............. *H04L 9/32* (2013.01); *H04L 9/0825* (2013.01); *H04L 9/0833* (2013.01);
(Continued)

(58) Field of Classification Search
CPC . H04L 9/0825; H04L 9/30; H04L 9/32; H04L 9/3236; H04L 9/3273;
(Continued)

(56) References Cited

U.S. PATENT DOCUMENTS 9,980,140 B1 * 5/2018 Spencer ............. G06K 7/10722
2004/0117618 A1 * 6/2004 Kawaguchi ............. H04L 67/04
713/156

(Continued)

FOREIGN PATENT DOCUMENTS

JP    2003-124927 A    4/2003
JP    2008-46554 A     2/2008
(Continued)

OTHER PUBLICATIONS

Office Action, dated Sep. 23, 2020, issued in Japanese Patent Application No. 2019-039047 (w/ English translation, 6 pages).

(Continued)

*Primary Examiner* — Benjamin E Lanier
(74) *Attorney, Agent, or Firm* — WHDA, LLP

(57) ABSTRACT

A first apparatus performs a pairing providing process of displaying a provision string on the first apparatus and transmitting the provision string to a server apparatus, the provision string being of a given number of digits that changes every given amount of time in such a manner that, every given amount of time, the provision string is subjected to carrying and a new character is added to the rightmost digit of the provision string. A second apparatus transmits an acceptance string to the server apparatus, the acceptance string being input from the second apparatus based on the provision string displayed on the first apparatus. The server apparatus compares the provision string with the acceptance string, and determines that pairing is established between the first apparatus and the second apparatus when the provision string and the acceptance string match each other.

9 Claims, 26 Drawing Sheets

(51) Int. Cl.
*H04L 9/08* (2006.01)
*H04L 9/14* (2006.01)
*H04L 9/30* (2006.01)

(52) U.S. Cl.
CPC .......... *H04L 9/0861* (2013.01); *H04L 9/0863* (2013.01); *H04L 9/0894* (2013.01); *H04L 9/14* (2013.01); *H04L 9/30* (2013.01); *H04L 9/3236* (2013.01); *H04L 9/3273* (2013.01); *H04L 63/0442* (2013.01); *H04L 63/08* (2013.01); *H04L 63/0838* (2013.01); *H04L 63/0846* (2013.01); *H04L 63/0869* (2013.01); *H04L 63/12* (2013.01)

(58) Field of Classification Search
CPC ....... H04L 9/0894; H04L 9/0861; H04L 9/14; H04L 63/0442; H04L 63/08; H04L 63/0825; H04L 63/0869; H04L 63/12
See application file for complete search history.

(56) References Cited

U.S. PATENT DOCUMENTS

| | | | |
|---|---|---|---|
| 2005/0287990 A1* | 12/2005 | Mononen | ............ H04L 63/0421 455/411 |
| 2008/0155260 A1 | 6/2008 | Perez et al. | |
| 2009/0097641 A1 | 4/2009 | Matsuzaki et al. | |
| 2010/0088519 A1* | 4/2010 | Tsuruoka | ............... H04L 9/3273 713/176 |
| 2011/0085204 A1 | 4/2011 | Hamada et al. | |
| 2014/0165175 A1 | 6/2014 | Sugiyama | |
| 2015/0074403 A1 | 3/2015 | Perez et al. | |
| 2015/0304110 A1 | 10/2015 | Oberheide et al. | |
| 2015/0365512 A1 | 12/2015 | MacKenzie et al. | |
| 2016/0057125 A1 | 2/2016 | Li | |
| 2016/0255089 A1* | 9/2016 | Diestler | .............. G06F 21/6236 726/4 |
| 2016/0344712 A1* | 11/2016 | Ding | ..................... H04L 63/061 |
| 2017/0149873 A1 | 5/2017 | Jang et al. | |
| 2017/0208058 A1 | 7/2017 | Zhou | |
| 2019/0334884 A1* | 10/2019 | Ross | ....................... G06F 21/41 |

FOREIGN PATENT DOCUMENTS

| | | |
|---|---|---|
| JP | 2010-506542 A | 2/2010 |
| JP | 2011-101338 A | 5/2011 |
| JP | 2014-238635 A | 12/2014 |
| JP | 2015-22632 A | 2/2015 |

OTHER PUBLICATIONS

Office Action, dated Mar. 31, 2020, issued in Japanese Patent Application No. 2019-039047 (w/ English translation, 6 pages).

* cited by examiner

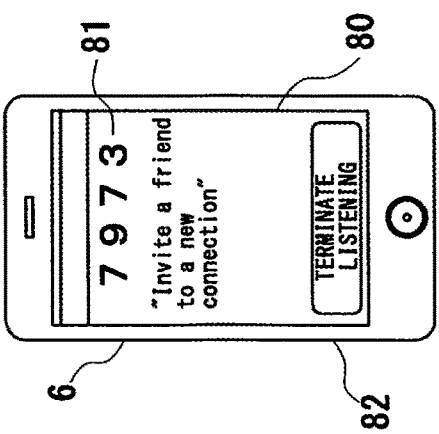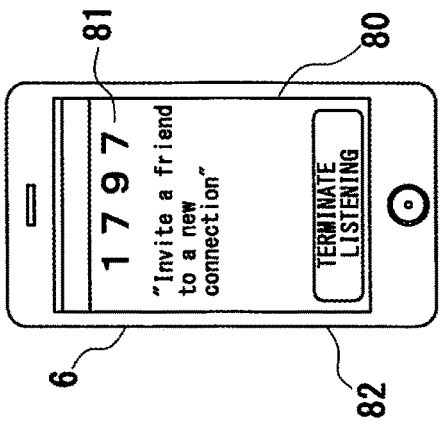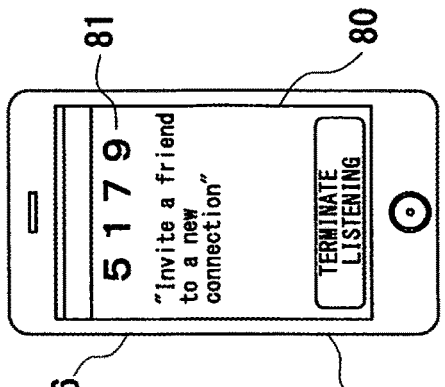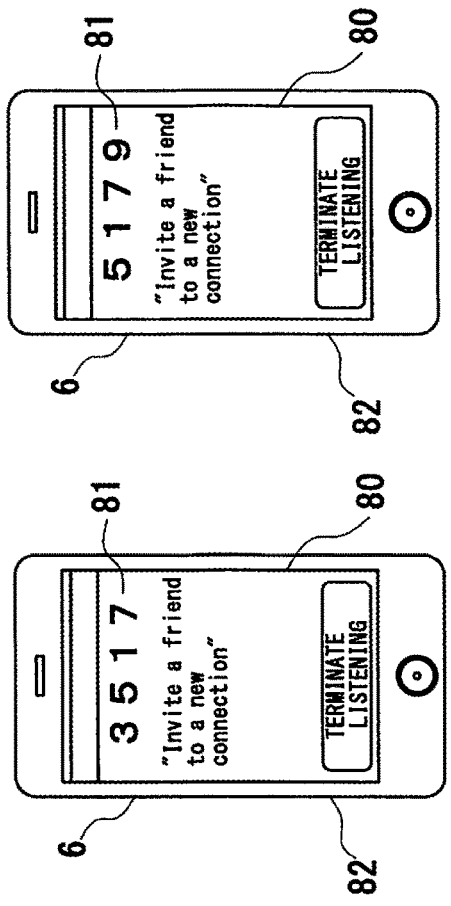

Fig. 16

| PROVIDER ID | STREAM SEED DATA | |
|---|---|---|
| | TIME HEADER | STREAM SEED |
| 123456 | 2015.6.4 10:45:20 | 35179734····02 |
| 123455 | 2015.6.4 10:42:10 | 23867921····94 |
| 123454 | 2015.6.4 10:38:50 | 76134463····77 |
| ... | ... | ... |

| ACCEPTANCE STRING | 7973 |
| --- | --- |
| TIME STAMP | 2015.6.4 10:45:50 |
| TARGET PROVIDER VALUE | ALL |

| PROVIDER ID | STREAM SEED DATA | |
| --- | --- | --- |
| | TIME HEADER | STREAM SEED |
| 123456 | 2015.6.4 10:45:20 ... | 351[7973]4····02 ... |

Fig. 25

| SERVICE ID | SERVICE NAME | INTERNAL USER ID | KEY GROUP ID | TYPE | KEY |
|---|---|---|---|---|---|
| N/A | N/A | N/A | 0 | PRIVATE KEY | Afdf4indak... |
| N/A | N/A | N/A | 0 | PUBLIC KEY | d35n4pzq... |
| AAA | SERVICE A | BBB | 0 | PUBLIC KEY | 4zccdp3iz... |
| CCC | SERVICE C | DDD | 0 | PUBLIC KEY | Izp18dbsu9... |
| N/A | N/A | N/A | 1 | PRIVATE KEY | MIICOjCCAb... |
| N/A | N/A | N/A | 1 | PUBLIC KEY | CAQAwgYw... |
| EEE | SERVICE E | FFF | 1 | PUBLIC KEY | c6J4mbz7... |

| INTERNAL USER ID | KEY GROUP ID | TYPE | KEY |
|---|---|---|---|
| N/A | 0 | PRIVATE KEY | Afdf4indak... |
| N/A | 0 | PUBLIC KEY | 4zccdp3iz... |
| BBB | 0 | PUBLIC KEY | d35n4pzq... |
| GGG | 0 | PUBLIC KEY | SAH+Vd4p... |
| N/A | 1 | PRIVATE KEY | WajblnH22... |
| N/A | 1 | PUBLIC KEY | sRl9zwVh5... |
| HHH | 1 | PUBLIC KEY | AMA0GCSq... |

46

INFORMATION COMMUNICATION SYSTEM FOR ESTABLISHING PAIRING IN INFORMATION COMMUNICATION NETWORK

CROSS REFERENCE OF RELATED APPLICATIONS

This application is a divisional of U.S. application Ser. No. 15/429,351 filed on Feb. 20, 2017, and issued as U.S. Pat. No. 10,454,682 on Oct. 22, 2019, which claims benefit of Japanese Patent Applications No. 2016-206439 filed on Oct. 21, 2016, the entire disclosure of each of the foregoing, including the specification, claims, drawings and abstract, is incorporated herein by reference.

BACKGROUND OF THE INVENTION

Field of the Invention

The present invention relates to an information communication system, in particular to pairing among a plurality of apparatuses connected to an information communication network.

Description of the Related Art

As a method for implementing pairing between two client terminals (e.g., smartphones) that are present at the same location at the same time, shake processing and QR code (Japanese registered trademark, the same applies hereafter) processing are known (see Japanese Patent Laid-Open No. 2015-22632, Paragraphs [0211] to [0239], FIG. 19, and FIG. 20).

Implementation of pairing using these methods has an advantage in that intercommunication is enabled with a certain counterpart that does not disclose private information such as a telephone number and an e-mail address, in advance. In addition, these methods implement pairing between two client terminals over an information communication network such as the Internet, and thus it is possible to implement the pairing even when the client terminals do not include infrared communication means and Bluetooth (Japanese registered trademark, the same applies hereafter) communication means, for direct communication.

However, to perform the aforementioned shake processing, both the client terminals have to include accelerometers and have GPS functions. In addition, to perform the QR code processing, at least one of the client terminals has to include a display device capable of displaying an image, and the other client terminal has to have a camera function.

Therefore, the aforementioned methods involve a problem in that they are not applicable to every type of apparatuses.

SUMMARY OF THE INVENTION

The present invention has an objective to solve such existing problems and to provide an information communication system and the like that implement pairing between apparatuses of more types connected to an information communication network. The term "pairing" refers to establishment of communication over an information communication network between two apparatuses specified as counterparts.

An information communication system according to the present invention is an information communication system including a plurality of apparatuses connected to an information communication network and a server apparatus connected to the information communication network, wherein a first apparatus of the plurality of apparatuses includes a first controller including a pairing provision processing unit that performs a pairing providing process of displaying a provision string on a display device of the first apparatus and transmitting pairing provision information containing the provision string to the server apparatus, the provision string being a character string of a given number of digits that is configured to change every given amount of time in such a manner that, every given amount of time, the character string is subjected to carrying and a new character is added to the rightmost digit of the character string; a second apparatus of the plurality of apparatuses includes a second controller including a pairing acceptance processing unit that performs a pairing accepting process of displaying an acceptance string on a display device of the second apparatus and transmitting pairing acceptance information containing the displayed acceptance string to the server apparatus, the acceptance string being a character string that is input from an input device of the second apparatus based on the provision string displayed on the display device of the first apparatus; the server apparatus includes a server side controller including a pairing determination processing unit that compares the provision string contained in the pairing provision information received from the first apparatus with the acceptance string contained in the pairing acceptance information received from the second apparatus, and determines that pairing is established between the first apparatus and the second apparatus on a condition that the provision string and the acceptance string are determined to match each other; and the pairing acceptance processing unit of the second apparatus includes a carry processing unit that performs carrying on an acceptance string corresponding to a provision string before the changing, in order to follow the changing of the provision string in the first apparatus, and adding a character to the rightmost digit of the acceptance string, the character being input from the input device of the second apparatus and corresponding to the new character added to the rightmost digit of the provision string, so as to generate an acceptance string corresponding to the provision string after the changing.

Although the features of the present invention can be expressed as described above in a broad sense, the configuration and content of the present invention, as well as the objectives and features thereof, will be apparent with reference to the following disclosure, taken in connection with the accompanying drawings.

BRIEF DESCRIPTION OF THE DRAWINGS

FIG. 11A, FIG. 11B, FIG. 11C, and FIG. 11D are drawings illustrating an example of a display screen of a provider 6 in the pairing process;

FIG. 16 is a drawing illustrating an example of a data configuration of a listening table 26;

FIG. 17A and FIG. 17B are drawings for illustrating some processes in the pairing process;

FIG. 25 is a drawing illustrating an example of a data configuration of an authentication side table 36; and FIG. 26 is a drawing illustrating an example of a data configuration of a service side table 46.

DETAILED DESCRIPTION OF THE PREFERRED EMBODIMENT

Figure 1:
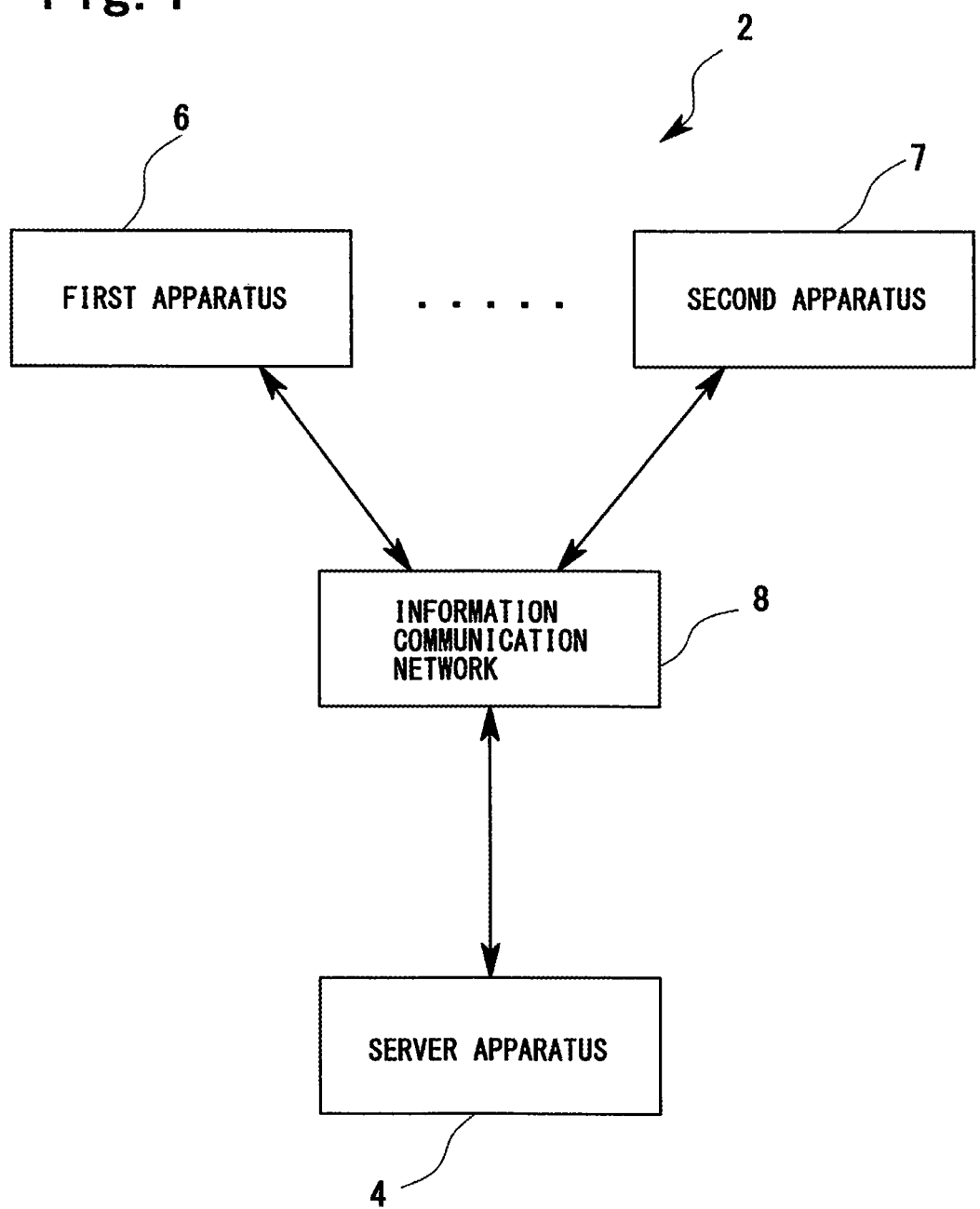
FIG. 1 is a block diagram illustrating a configuration of an information communication system 2 according to an embodiment of the present invention.

FIG. 1 is a block diagram illustrating a configuration of an information communication system 2 according to an embodiment of the present invention. The information communication system 2 includes a first apparatus 6 and a second apparatus 7 as a plurality of apparatuses, the first apparatus 6 and the second apparatus 7 being connected to an information communication network 8, and a server apparatus 4, which is connected to an information communication network 8.

FIG. 1 illustrates an example of the case where pairing is established between one first apparatus 6 and one second apparatus 7, and the configuration may be made so that pairing is established between one first apparatus 6 and a plurality of second apparatuses 7, which will be described later.

Figure 2:
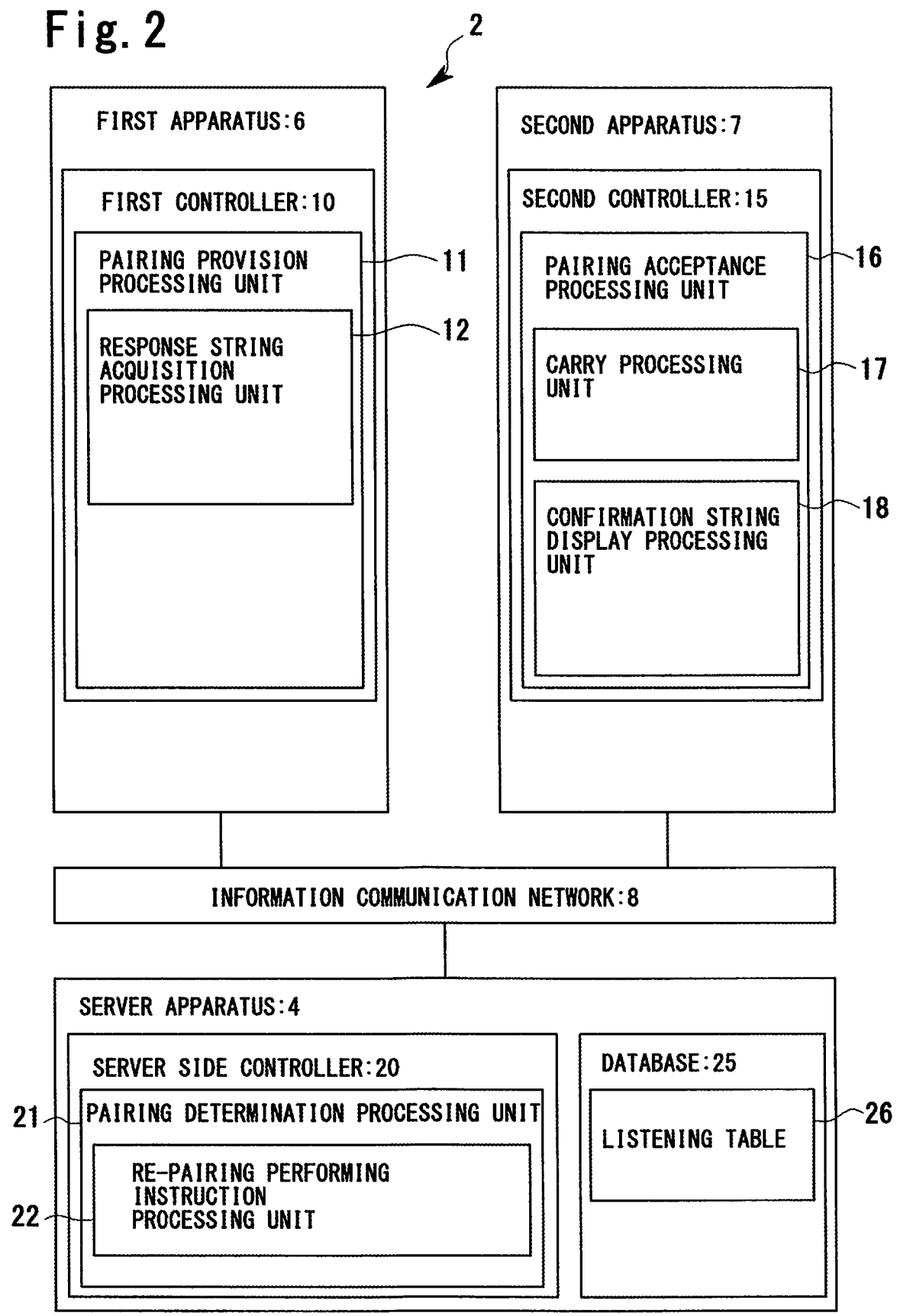
FIG. 2 is a block diagram illustrating a configuration of a first apparatus 6, a second apparatus 7, and a server apparatus 4.

Next, FIG. 2 is a block diagram illustrating a configuration of the first apparatus 6, the second apparatus 7, and the server apparatus 4.

As illustrated in FIG. 2, the first apparatus 6 includes a first controller 10. The first controller 10 includes a pairing provision processing unit 11.

The pairing provision processing unit 11 performs a pairing providing process. In the pairing providing process, a provision string is displayed on a display device of the first apparatus 6. The provision string is a character string of a given number of digits that is configured to change every given amount of time in such a manner that, every given amount of time, the character string is subjected to carrying and a new character is added to the rightmost digit of the character string. In addition, in the pairing providing process, pairing provision information containing the provision string is transmitted to the server apparatus 4.

The second apparatus 7 includes a second controller 15. The second controller 15 includes a pairing acceptance processing unit 16.

The pairing acceptance processing unit 16 performs a pairing accepting process. In the pairing accepting process, an acceptance string is displayed on a display device of the second apparatus 7. The acceptance string is a character string that is input from an input device of the second apparatus 7 based on the provision string displayed on the display device of the first apparatus 6. In addition, in the pairing accepting process, pairing acceptance information containing the acceptance string is transmitted to the server apparatus 4.

The pairing acceptance processing unit 16 includes a carry processing unit 17. In order to follow the changing of the provision string in the first apparatus 6, the carry processing unit 17 performs carrying on an acceptance string corresponding to a provision string before the changing, and adds a character to the rightmost digit of the acceptance string, the character being input from the input device of the second apparatus 7 and corresponding to the new character added to the rightmost digit of the provision string, so as to generate an acceptance string corresponding to the provision string after the changing.

The carry processing unit 17 is further configured to perform carrying on the acceptance string in synchronization with the carrying of the provision string in the first apparatus 6.

The server apparatus 4 includes a server side controller 20. The server side controller 20 includes a pairing determination processing unit 21.

The pairing determination processing unit 21 compares the provision string contained in the pairing provision information received from the first apparatus 6 with the acceptance string contained in the pairing acceptance information received from the second apparatus 7, and determines that pairing is established between the first apparatus 6 and the second apparatus 7 on the condition that the provision string and the acceptance string are determined to match each other.

The pairing determination processing unit 21 further includes a re-pairing performing instruction processing unit 22.

When the first apparatus 6 corresponding to a provision string that matches the acceptance string contained in the pairing acceptance information received from the second apparatus 7 includes a plurality of first apparatuses 6, the re-pairing performing instruction processing unit 22 urges the plurality of first apparatuses 6 to perform the pairing providing process again, and at the same time instructs the second apparatus 7 to perform the pairing accepting process again.

The pairing acceptance processing unit 16 of the second apparatus 7 further includes a confirmation string display processing unit 18.

On the condition that the pairing determination processing unit 21 of the server apparatus 4 determines that the provision string and the acceptance string match each other, the confirmation string display processing unit 18 displays a confirmation string on the display device of the second apparatus 7.

The pairing provision processing unit 11 of the first apparatus 6 further includes a response string acquisition processing unit 12.

The response string acquisition processing unit 12 acquires a response string. The response string is a character string that is input from an input device of the first apparatus 6 based on the confirmation string displayed on the display device of the second apparatus 7.

The pairing determination processing unit 21 of the server apparatus 4 is further configured to determine that pairing is established between the first apparatus 6 and the second apparatus 7, on the condition that the confirmation string displayed on the display device of the second apparatus 7 matches the response string acquired by the first apparatus 6.

The server apparatus 4 includes a database 25. The database 25 includes a listening table 26, which will be described later.

Figure 3:
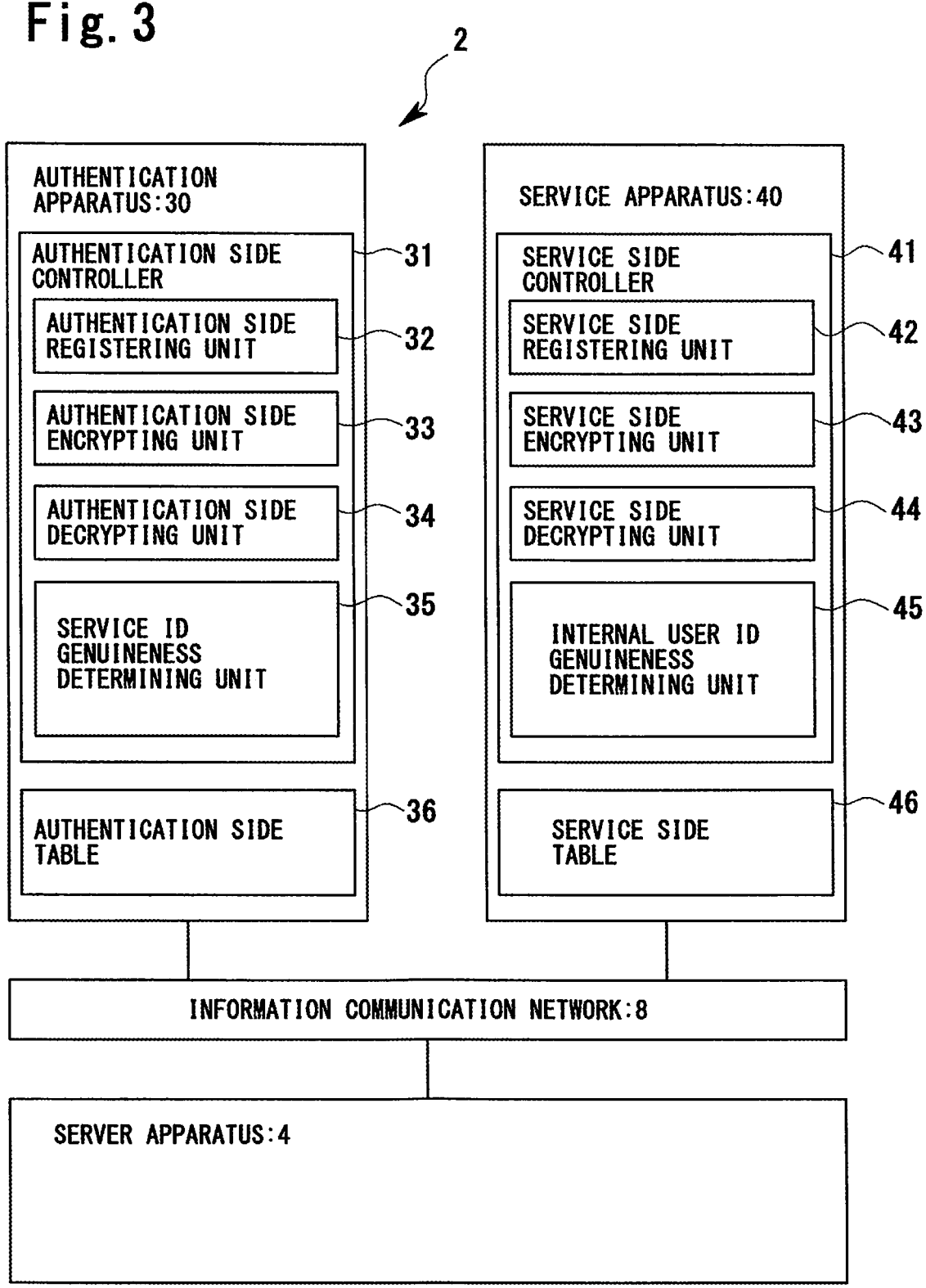
FIG. 3 is a block diagram illustrating a configuration of a service apparatus 40 and an authentication apparatus 30, which constitute the information communication system 2, as an application example.

FIG. 3 is a block diagram illustrating a configuration of a service apparatus 40 and an authentication apparatus 30, which constitute an information communication system 2, as an application example.

The service apparatus 40 is an apparatus that provides a specified service. The authentication apparatus 30 is an apparatus that performs authentication at a time of using the specified service.

The information communication system 2 illustrated in FIG. 3 is a system that, with one of the first apparatus 6 and the second apparatus 7 serving as the service apparatus 40 and the other serving as the authentication apparatus 30, performs authentication for making the specific service available on a precondition that pairing is established between the service apparatus 40 and the authentication apparatus 30.

As illustrated in FIG. 3, the authentication apparatus 30 includes an authentication side controller 31. The authentication side controller 31 includes an authentication side registering unit 32.

The authentication side registering unit 32 generates an authentication side private key being a private key to be used by the authentication apparatus 30 and an authentication side public key being a public key corresponding to the authentication side private key, stores the authentication side private key, and transmits the authentication side public key to the service apparatus 40.

The service apparatus 40 includes a service side controller 41. The service side controller 41 includes a service side registering unit 42.

Upon receiving the authentication side public key from the authentication apparatus 30, the service side registering unit 42 generates an internal user ID being an identification marker for the authentication apparatus 30 in the specific service, stores the authentication side public key associating it with the internal user ID, and transmits the internal user ID to the authentication apparatus 30.

The service side controller 41 of the service apparatus 40 includes a service side encrypting unit 43.

Upon receiving information to request authentication with the internal user ID specified, from the authentication apparatus 30, the service side encrypting unit 43 generates service side encrypted data and transmits it to the authentication apparatus 30. The service side encrypted data is data obtained by encrypting service side original data being any data prepared in the service apparatus 40, using the authentication side public key that corresponds to the internal user ID and is stored in the service side registering unit 42.

The authentication side controller 31 of the authentication apparatus 30 includes an authentication side decrypting unit 34.

The authentication side decrypting unit 34 transmits, to the service apparatus 40, service side computed data that is obtained by performing predetermined computation on service side decrypted data. The service side decrypted data is data obtained by decrypting the service side encrypted data received from the service apparatus 40, using the authentication side private key that is stored in the authentication side registering unit 32.

The service side controller 41 of the service apparatus 40 includes an internal user ID genuineness determining unit 45.

When the service side computed data received from the authentication apparatus 30 matches data obtained by performing the predetermined computation on the service side original data, the internal user ID genuineness determining unit 45 determines that the internal user ID is genuine.

The service side registering unit 42 further generates a service side private key being a private key to be used by the service apparatus 40 and a service side public key being a public key corresponding to the service side private key, stores the service side private key, and transmits the service side public key together with a service ID that is an identification marker for the service apparatus 40 in the specific service, to the authentication apparatus 30.

Upon receiving the service side public key from the service apparatus 40, the authentication side registering unit 32 stores the service side public key, associating it with the service ID.

The authentication side controller 31 of the authentication apparatus 30 includes an authentication side encrypting unit 33.

Upon receiving information to request authentication with the service ID specified, from the service apparatus 40, the authentication side encrypting unit 33 generates authentication side encrypted data and transmits it to the service apparatus 40. The authentication side encrypted data is data obtained by encrypting authentication side original data being any data prepared in the authentication apparatus 30, using the service side public key, that corresponds to the service ID, and is stored in the authentication side registering unit 32.

The service side controller 41 of the service apparatus 40 includes a service side decrypting unit 44.

The service side decrypting unit 44 transmits, to the authentication apparatus 30, authentication side computed data that is obtained by performing predetermined computation on authentication side decrypted data. The authentication side decrypted data is data obtained by decrypting the authentication side encrypted data received from the authentication apparatus 30, using the service side private key that is stored in the service side registering unit 42.

The authentication side controller 31 of the authentication apparatus 30 includes a service ID genuineness determining unit 35.

If the authentication side computed data received from the service apparatus 40 matches data that is obtained by performing the predetermined computation on the authentication side original data, the service ID genuineness determining unit 35 determines that the service ID is genuine.

The authentication apparatus 30 includes an authentication side table 36. The service apparatus 40 includes a service side table 46. The tables 36 and 46 will be described later.

Figure 4:
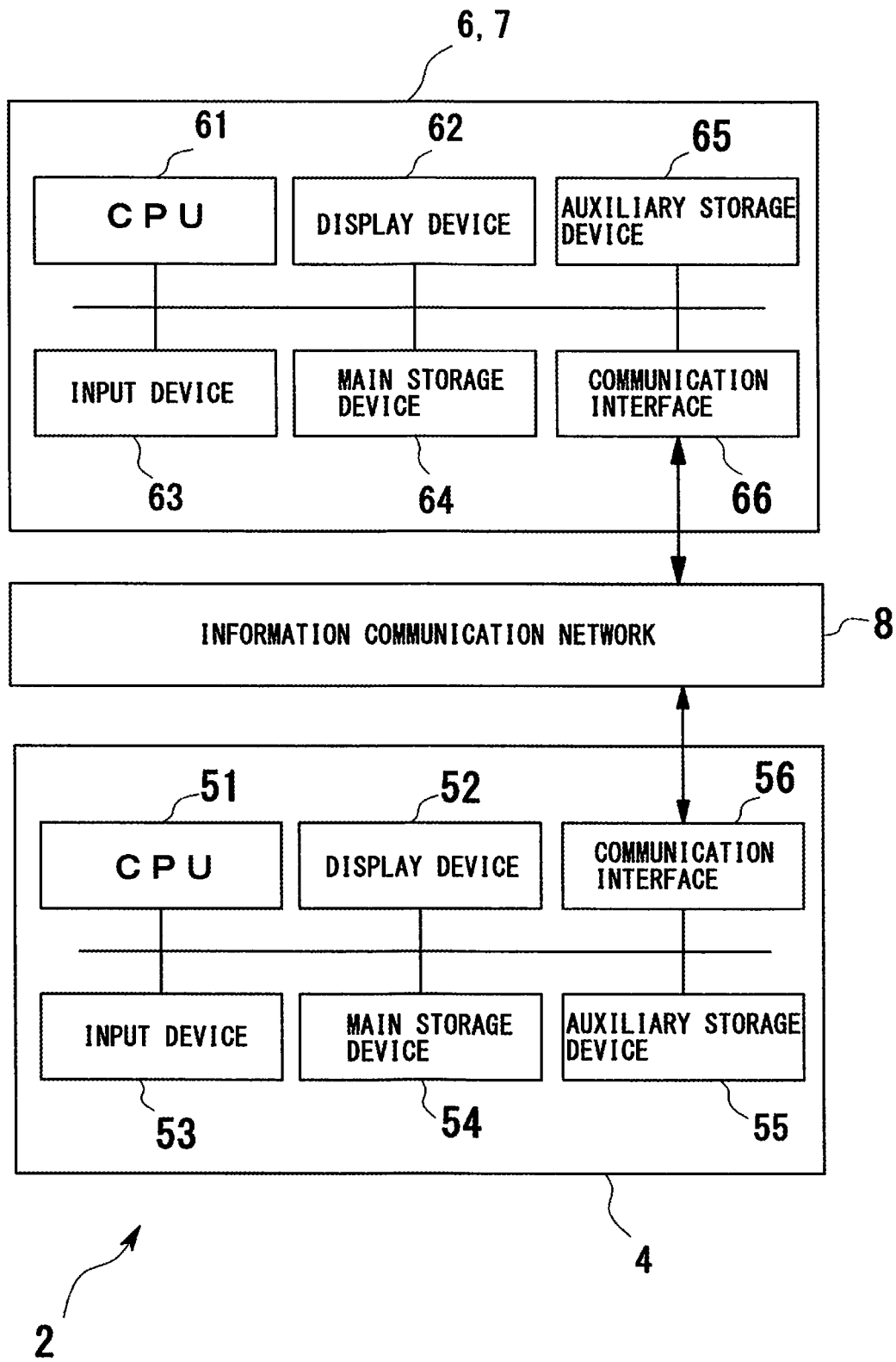
FIG. 4 is a block diagram illustrating an example of a hardware configuration of the server apparatus 4, the first apparatus 6, and the second apparatus 7 illustrated in FIG. 2 or FIG. 3 (including the authentication apparatus 30 and the service apparatus 40 each being the first apparatus 6 or the second apparatus 7, respectively)

FIG. 4 is a block diagram illustrating an example of a hardware configuration of the server apparatus 4, the first apparatus 6, and the second apparatus 7 illustrated in FIG. 2 or FIG. 3 (including the authentication apparatus 30 and the service apparatus 40 each being the first apparatus 6 or the second apparatus 7, respectively, and the same applies hereafter).

The server apparatus 4 is not limited in particular and in this example has the same configuration as that of a typical server computer.

The server apparatus 4 includes an auxiliary storage device 55 such as an hard disk drive (HDD) including a hard disk that is a recording medium in which a program for the server apparatus 4 of the information communication system 2 is stored, as well as a storage medium for the database 25, a main storage device 54 into which the program stored in the auxiliary storage device 55 is loaded, a CPU 51 for the server side controller 20 that executes the program loaded into the main storage device 54, a display device 52 such as a liquid crystal display (LCD), an input device 53 such as a keyboard, a mouse, and a track pad, and a communication interface 56 that performs communication with the first apparatus 6 or the second apparatus 7 through the information communication network 8.

The first apparatus 6 is not limited in particular and may be, for example, a personal computer, a tablet computer, a personal digital assistant device, or a mobile telephone represented by what is called a smartphone. Furthermore, the first apparatus 6 may be a home appliance, an apparatus for production, or an apparatus for transportation such as automobile. The same is true for the second apparatus 7. The point is that the present invention is applicable to any apparatus, as the first apparatus 6 or the second apparatus 7, as long as the apparatus is an apparatus to be connected to the information communication network 8.

FIG. 4 illustrates a hardware configuration of the case where the first apparatus 6 and the second apparatus 7 are both smartphones.

The first apparatus 6 includes an auxiliary storage device 65 such as a solid state drive (SSD) including a flash memory that is a recording medium in which a program for the first apparatus 6 of the information communication system 2 is stored, a main storage device 64 into which the program stored in the auxiliary storage device 65 is loaded, a CPU 61 for the first controller 10 that executes the program loaded into the main storage device 64, a display device 62 such as a liquid crystal display (LCD), an input device 63 such as an input key and a touch panel, and a communication interface 66 that performs communication with the server apparatus 4 and the second apparatus 7 through the information communication network 8.

The second apparatus 7 has the same hardware configuration as that of first apparatus 6.

The information communication network 8 is a communication network for transmitting information, of either wired or wireless. Examples of the information communication network 8 include a computer network such as a wide area network (WAN) represented by the Internet, and a local area network (LAN), a telephone line (including a mobile telephone line, and the same applies hereafter) or a combination thereof.

FIG. 5 to FIG. 10 are flowcharts illustrating an example of a flow of a process to perform pairing in the present application (hereafter, may be referred to as a "pairing process"). Hereafter, the server apparatus 4 may be referred to as a server 4, the first apparatus 6 as a provider 6, and the second apparatus 7 as a register 7. In addition, description will be made about an example in which the information communication network 8 is the Internet or the combination of the Internet and a telephone line.

FIG. 11A to FIG. 15B are drawings illustrating an example of display screens of the provider 6 or the register 7 in the pairing process. FIG. 16 is a drawing illustrating an example of a data configuration of the listening table 26. FIG. 17A and FIG. 17B are drawings for illustrating some processes in the pairing process.

Referring to FIG. 5 to FIG. 17B, the pairing process will be described.

Figure 5:
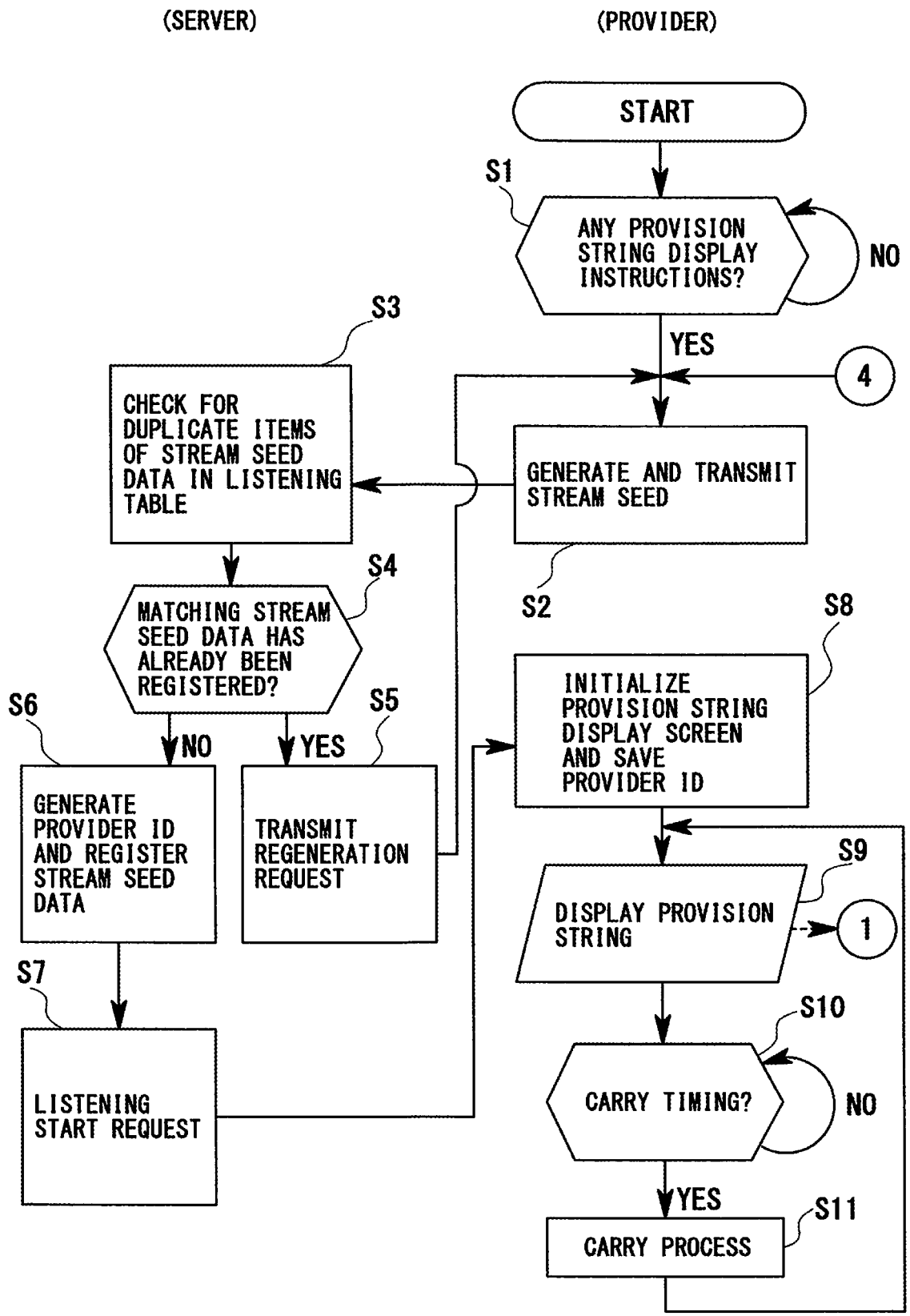
FIG. 5 is a flowchart illustrating an example of a flow of a pairing process in the present application.

As illustrated in FIG. 5, the CPU 61 of the provider 6 (may be hereafter simply referred to as a "provider 6") monitors the presence/absence of instructions to display a provision string (step S1).

When the instructions to display a provision string is input from the input device 63 of the provider 6 (may be hereafter simply referred to as a "provider 6") in step S1, a stream seed is generated, and stream seed data being a combination of the generated stream seed and a time header is stored in a storage device of the provider 6, namely, the main storage device 64 or the auxiliary storage device 65 (may be hereafter simply referred to as a "provider 6"), and is transmitted to the server 4.(step S2).

The stream seed is a character string from which a provision string is originated, and is larger in number of digits than the provision string. The stream seed is not limited in particular in its configuration and can be made up of a random number.

The provision string is not limited in particular in its character type and length, but in this embodiment, description will be made by way of example about a case where the provision string is four-digit numeral. In addition, the stream seed is assumed to be a 183-digit numeral. The reason for this will be described later.

The time header contains a point in time to serve as a timing reference for extracting the provision string from the stream seed. A method for fixing the time header will be described later.

Upon receiving the stream seed data, the CPU 51 of the server 4 (may be hereafter simply referred to as a "server 4") searches the listening table 26 to check whether or not there is already-registered stream seed data that matches the received stream seed data (step S3 and step S4).

If there is already-registered stream seed data matching the received stream seed data, a request to regenerate stream seed data is transmitted to the provider 6, and the provider 6 having been received the request returns the control to step S2 (step S5).

On the other hand, if there is no already-registered stream seed data matching the received stream seed data in step S4, the server 4 generates a provider ID as an identification marker to identify the pairing (session), and newly registers a record containing the provider ID and the received stream seed data that are associated with each other, to the listening table 26 (step S6).

As illustrated in FIG. 16, a record in the listening table 26 consists of two fields: provider ID and stream seed data, and the stream seed data consists of two subfields: time header and stream seed.

The server 4 transmits, to the provider 6, listening start request for pairing containing a provider ID (in this example, this is "123456" corresponding to a record in the top row of the listening table 26 illustrated in FIG. 16) (step S7).

Upon receiving this request, the provider 6 stores the provider ID, initializes a display screen for the provision string (step S8), and displays the provision string (step S9).

As illustrated in FIG. 11A, a provision string "3517" is displayed in a provision string displaying section 81 on an initialized display screen 80 of the provider 6. This is a consecutive four-digit numeral that is extracted from the stream seed stored in the provider 6 in step S2 starting from the leading digit. Of course, this numeral matches a four-digit numeral that is consecutive from the leading digit of the stream seed corresponding to the provider ID "123456" in the listening table 26 illustrated in FIG. 16.

Next, the provider 6 monitors whether or not a carry timing of the provision string has come (step S10), if the carry timing has come, the provider 6 performs a carry process on the provision string, and returns the control to step S9 (step S11).

The carry timing of the provision string is not limited in particular, but in this embodiment, the configuration is made so that the carry process is performed every lapse of ten seconds from a point in time indicated by a time header corresponding to the stream seed.

The time header is fixed based on the time of generation of the stream seed and a time interval for the carrying of the provision string. The time header can be made of a point in time equivalent to a product of an integer part of a value and the time interval of the carrying of the provision string, the value being obtained by dividing an elapsed time from a reference time of a built-in clock, namely, twelve midnight up to the time of generation of the stream seed by the time interval for the carrying of the provision string.

In this example, since the time interval for the carrying of the provision string is ten seconds, the point in time indicated by the time header is a point in time obtained by subtracting a fraction less than ten seconds from the time of generation of the stream seed.

As illustrated in FIG. 11B, a provision string "5179" is displayed in the provision string displaying section 81 on the display screen 80 after the carry process is performed. This is a consecutive four-digit numeral that is extracted from the stream seed stored in the provider 6 in step S2, starting from the second digit. Of course, this numeral matches a four-digit numeral that is consecutive from the second digit of the stream seed corresponding to the provider ID "123456" in the listening table 26 illustrated in FIG. 16.

Then, as the carry process is performed, the provision string changes likewise to "1797" (see FIG. 11C) and then "7973" (see FIG. 11D).

In general expression, in this embodiment, assuming that the provision string has a number of digits of n, and the character string constituting the stream seed created in advance has a number of characters of m (m>n), a consecutive n-digit character string is extracted from the character string constituting the stream seed starting from the leading digit, so as to form the provision string, and a starting point for extracting a consecutive n-digit character string is moved one digit to the right every lapse of a given amount of time, so as to cause the provision string to change every given amount of time.

As aforementioned, the stream seed is assumed to be a 183-digit numeral in this example. This is to allow listening for 30 minutes at maximum, assuming that the provision string is a four-digit numeral, and the carry process is performed on the provision string every lapse of ten seconds. Of course, this does not limit the number of digits of the stream seed.

Figure 6:
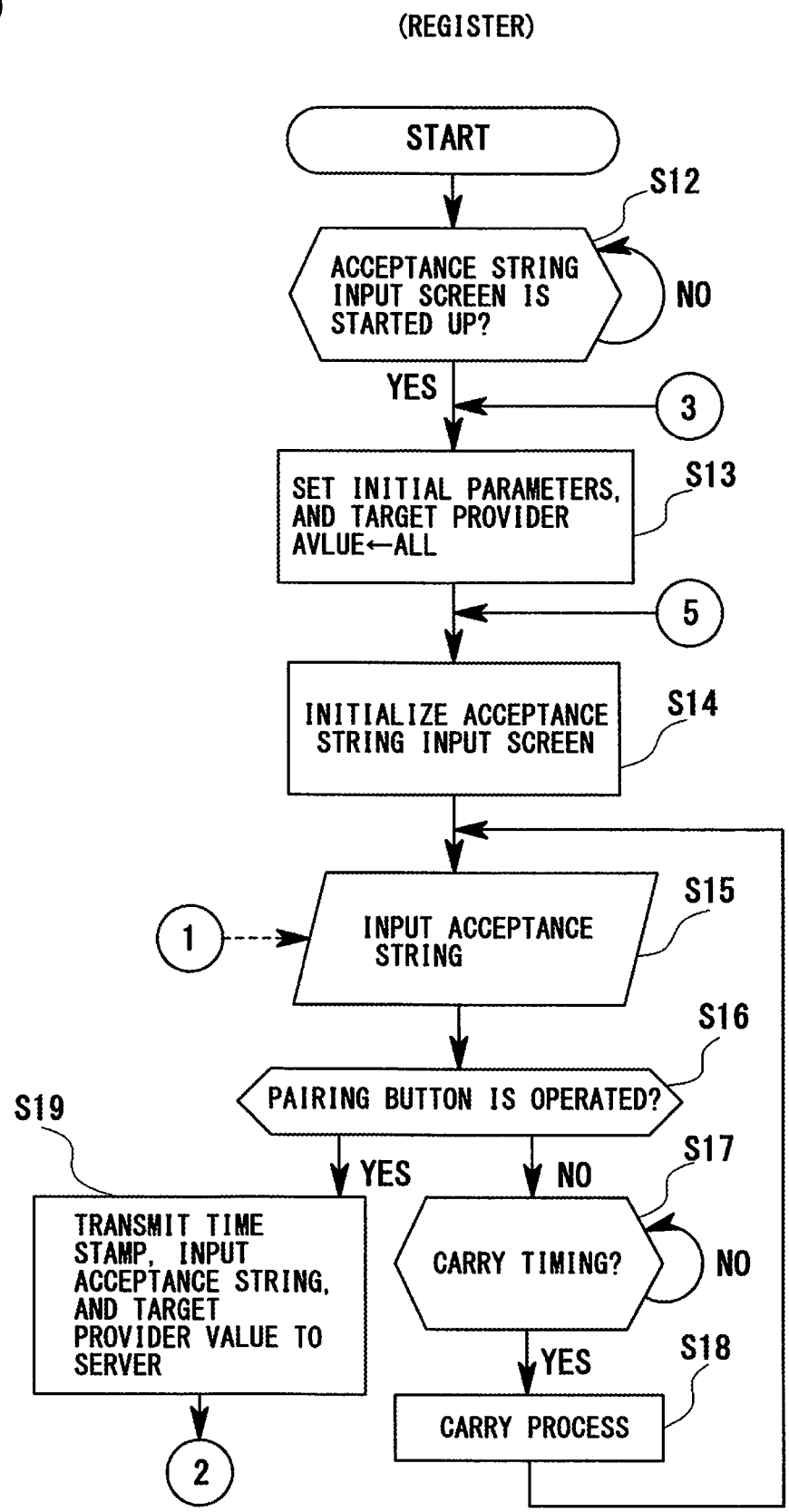
FIG. 6 is a flowchart illustrating the example of the flow of the pairing process in the present application.

Next, as illustrated in FIG. 6, the CPU 61 of the register 7 (may be hereafter simply referred to as a "register 7") monitors the presence/absence of instructions to start up an input screen for an acceptance string (step S12).

When the instructions to start up an input screen for an acceptance string is input from the input device 63 of the register 7 (may be hereafter simply referred to as a "register 7") in step S12, the register 7 performs setting of initial parameters and sets "ALL" to a target provider value (step S13).

The setting of initial parameters includes the correction of the built-in clock. The correction of the built-in clock is performed by synchronizing the clock with the clock of a specified time server on the Internet. The correction of the built-in clock is performed also in the provider 6 by the same method at appropriate times, which in turn synchronizes the built-in clocks of the register 7 and the provider 6.

The target provider value will be described later.

Subsequently, the register 7 initializes and displays a screen to input an acceptance string (step S14).

Figure 12D:
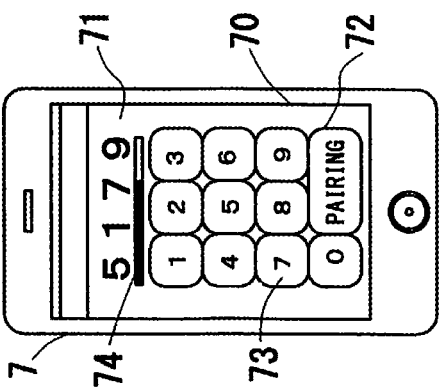
FIG. 12A, FIG. 12B, FIG. 12C, and FIG. 12D are drawings illustrating an example of a display screen of a register 7 in the pairing process.
Figure 12C:
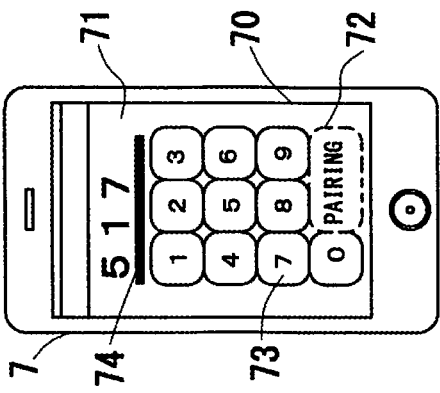
Figure 12B:
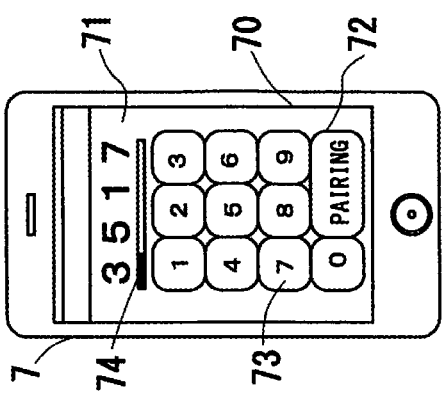
Figure 12A:
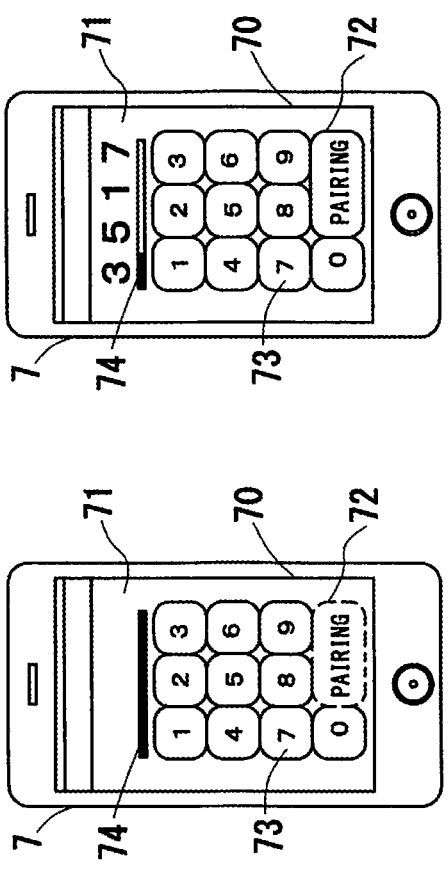

As illustrated in FIG. 12A, input key buttons 73 are displayed on an initialized display screen 70 of the register 7, allowing for input of a numeral. In a remaining time displaying section 74, a remaining time up to the carry of an acceptance string (to be described later) is displayed in a form of a graph (a progress bar in this example). In this example, the progress bar is configured to be reduced in length with a decrease in the remaining time. Nothing is displayed in an acceptance string displaying section 71. A pairing button 72 is configured to be operable only when a four-digit numeral is displayed in the acceptance string displaying section 71.

When the acceptance string is input to the register 7 by an operator of the register 7 at the sight of the provision string "3517" displayed in the provision string displaying section 81 on the display screen 80 of the provider 6 illustrated in FIG. 11A (step S15), the register 7 determines whether or not the pairing button 72 has been operated (step S16).

FIG. 12B illustrates the display screen 70 in a state where the acceptance string is input to the register 7. In this state, the pairing button 72 becomes operable.

If the pairing button 72 is not operated in step S16, the register 7 monitors whether or not the carry timing of the acceptance string has come (step S17). When the carry timing comes, the register 7 performs the carry process on the acceptance string and returns the control to step S15 (step S18).

The carrying of the acceptance string is configured to be performed in synchronization with the carrying of the provision string in the provider 6. In other words, the timing of the carrying of the acceptance string is fixed by the same method as that for the timing of the carrying of the provision string. In this example, performing carrying on acceptance string every exact ten seconds kept by a built-in clock of the register 7 allows synchronization with the carrying of the provision string in the provider 6.

As illustrated in FIG. 12C, in the acceptance string displaying section 71 on the display screen 70 after the carry process is performed, the first three digits "517" of a new acceptance string is displayed, and the rightmost digit of the acceptance string is left blank. In this state, the pairing button 72 is inoperable.

When a one-digit numeral ("9" in this case) is input in this state to the rightmost digit of the acceptance string by the operator of the register 7 having perceiving the provision string "5179" displayed in the provision string displaying section 81 on the display screen 80 of the provider 6 illustrated in FIG. 11B, a complete acceptance string "5179" is displayed in the acceptance string displaying section 71 on the display screen 70 as illustrated in FIG. 12D, which makes the pairing button 72 operable.

However, even if the operation of the pairing button 72 is delayed for some reason, during which the provision string displayed on the display screen 80 of the provider 6 changes to "1797" (see FIG. 11C) and then "7973" (see FIG. 11D), additional inputs of "7" and then "3" to the rightmost digit of the already-input acceptance string by the operator of the register 7 cause a complete acceptance string "7973" at that point to be displayed in the acceptance string displaying section 71 on the display screen 70 of the register 7, which makes the pairing button 72 operable.

When the pairing button 72 is operated at this point, the register 7 transmits the input acceptance string, a time stamp, and the target provider value (the value set in step S13 or a value set in step S25 to be described later) to the server 4 (step S19).

The time stamp is fixed by the same method as the method for fixing the time header, based on the time of operating the pairing button 72 and the time interval for the carrying of the provision string.

Figure 7:
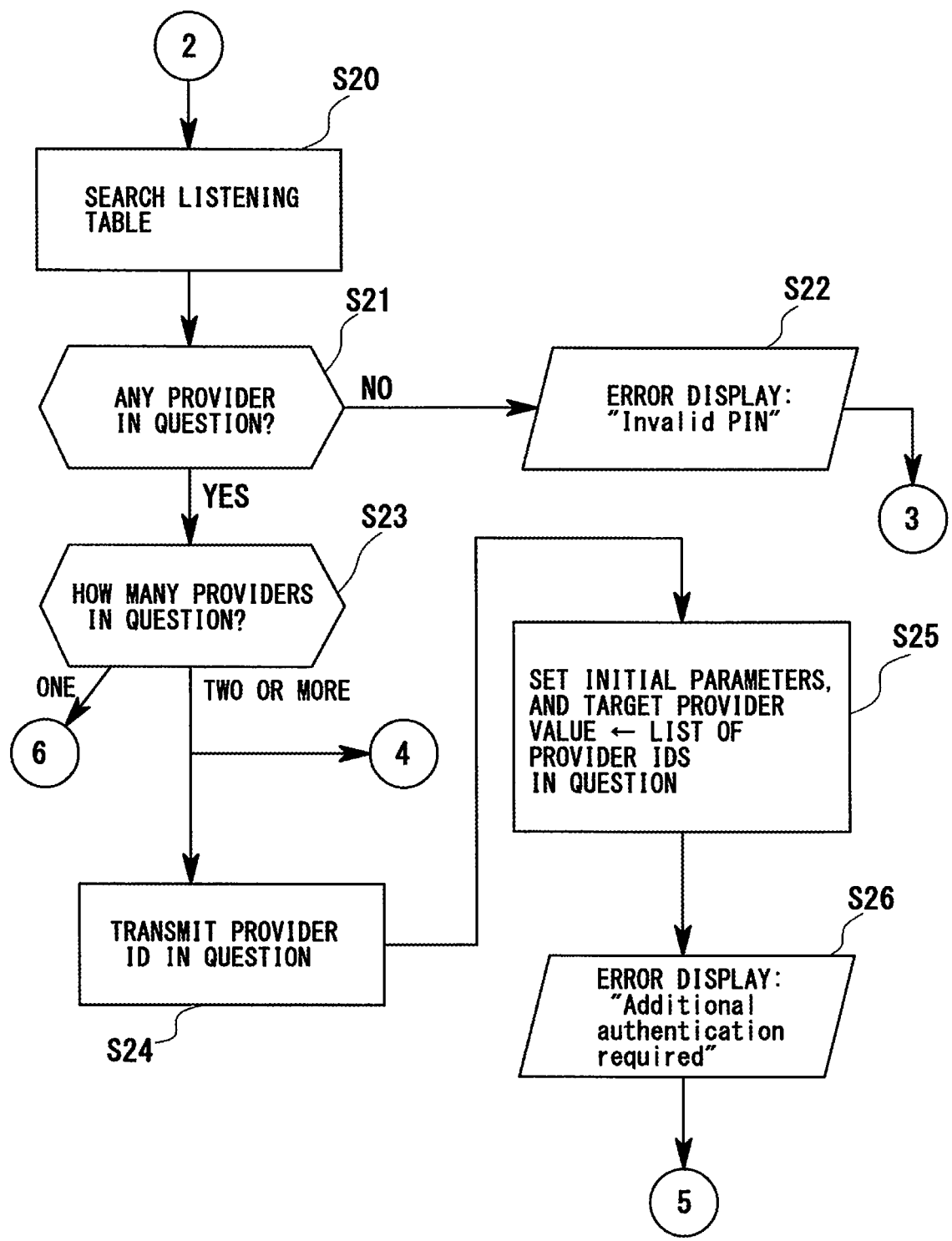
FIG. 7 is a flowchart illustrating the example of the flow of the pairing process in the present application.

Next, as illustrated in FIG. 7, the server 4 searches the listening table 26 based on the received acceptance string, the time stamp, and the target provider value (step S20) to determine the presence/absence of the provider 6 in question (step S21).

Step S20 and step S21 will be described in detail.

The target provider value refers to information to specify a record to be an object in the search of the listening table 26 in step S20 described above, and a record having a provider ID set as a target provider value is specified as a search object. A target provider value "ALL" means that all the records in the listening table 26 are specified as search objects.

FIG. 17A illustrates the acceptance string, the time stamp, and the target provider value received in step S20. In this case, since the target provider value is "ALL", all the records in the listening table 26 are search objects.

A value s is calculated. The value s is obtained by dividing the difference between a point in time in the time stamp and a point in time in the time header of a record to be a search object of the listening table 26, by the time interval for the carrying of the provision string (ten seconds in this example).

Assuming that the number of digits of the provision string is n (four in this example), a consecutive n-digit character string is extracted that is a character string constituting a stream seed in the record and is led by a character at a position moved s digits to the right from the leading digit of the stream seed. This extracted character string is compared with the received acceptance string.

When the both string match, it is determined in step S21 that the provider 6 in question is present.

For example, the comparison between the received information illustrated in FIG. 17A and a record indicated by a provider ID "123456" in the listening table 26 illustrated in FIG. 17B shows the aforementioned value s=3. A four-digit character string extracted based on this from a character string constituting a stream seed of the record is "7973", which matches the acceptance string 7973 illustrated in FIG. 17A. Therefore in this case, it is determined in step S21 that the provider 6 in question is present.

The determination is performed on all the records specified as the search objects.

Figure 13B:
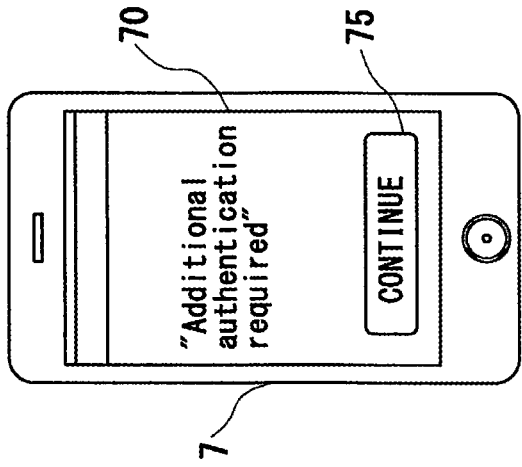
FIG. 13A and FIG. 13B are drawings illustrating an example of the display screen of the register 7 in the pairing process.
Figure 13A:
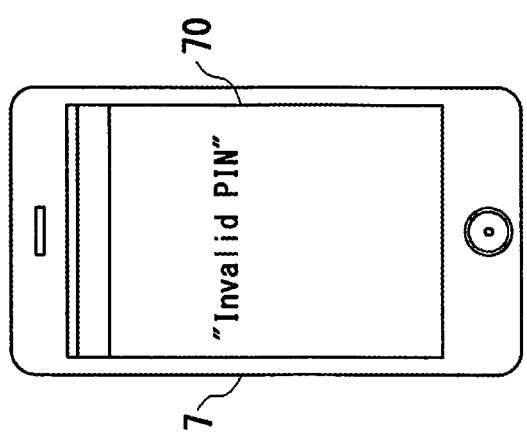

If the determination results in the absence of the provider 6 in question in step S21, information indicating this determination is transmitted from the server 4 to the register 7, and as illustrated in FIG. 13A, an indication "Invalid PIN" is displayed on the display screen 70 of the register 7 (step S22). This indication indicates that the acceptance string input from the register 7 and transmitted to the server 4 is invalid.

After the display in step S22, the register 7 returns the control to step S13 (see FIG. 6).

On the other hand, if it is determined in step S21 that the provider 6 in question is present, the server 4 determines whether the number of the providers in question is one or more (step S23).

If it is determined in step S23 that the number of the providers in question is more than one, the server 4 transmits information indicating the determination to all the providers 6 in question, and the provider 6 receiving this information returns the control to step S2 (see FIG. 5) and starts the control again with the generation and transmission of a stream seed.

The reason that the number of the providers 6 in question is more than one in step S23 is considered that provision strings accidentally match among a plurality of providers 6 performing listening for pairing at a certain point in time. Thus, the providers 6 in question are each caused to restart the generation and transmission of a stream seed, so as to eliminate the accidental match, enabling pairing with a desired counterpart.

The configuration can be made so that the control is returned to step S9 (see FIG. 5) rather than step S2 and the providers in question are caused to continue displaying the provision string if it is determined in step S23 that the number of providers in question is more than one. This is because the provision string automatically changes upon a lapse of the time interval for the carrying of the provision string (ten seconds in this example), and thus it can be considered that the provision string having changed has an extremely low possibility of matching among the plurality of providers in question again.

If it is determined in step S23 that the number of providers in question is more than one, the server 4 transmits information indicating the determination and containing a plurality of relevant provider IDs, to the register 7 (step S24).

The register 7 having received this information performs the same process as in the step S13 described above (see FIG. 6) (step S25). In step S25, unlike step S13, a list of the plurality of provider IDs received from the server 4 is set as a target provider value.

Subsequently, as illustrated in FIG. 13B, an indication "Additional authentication required" is displayed on the display screen 70 of the register 7 (step S26). This indication is an error indication indicating that pairing has not been established with the acceptance string input from the register 7 and transmitted to the server 4.

When a "Continue" button 75 displayed on the display screen 70 is operated, the register 7 returns the control to step S14 (see FIG. 6) and restarts the initialization of the input screen for an acceptance string.

Figure 8:
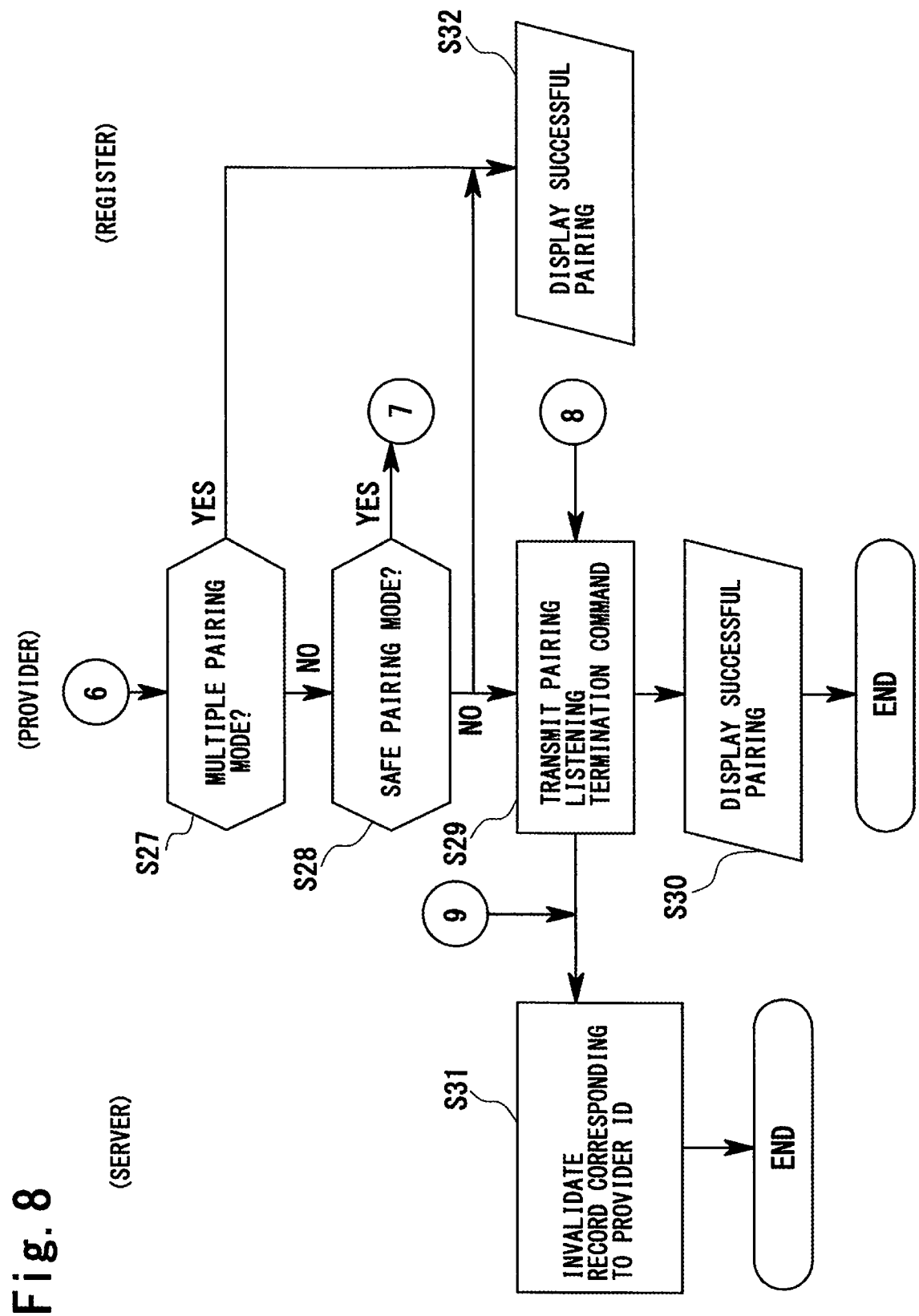
FIG. 8 is a flowchart illustrating the example of the flow of the pairing process in the present application.

On the other hand, if it is determined in step S23 that the number of the providers 6 in question is one, the server 4 transmits information indicating the determination to the provider 6 in question, and as illustrated in FIG. 8, the provider 6 having received this information determines whether or not the mode of pairing relating to the information is a multiple pairing mode (step S27).

Figure 14:
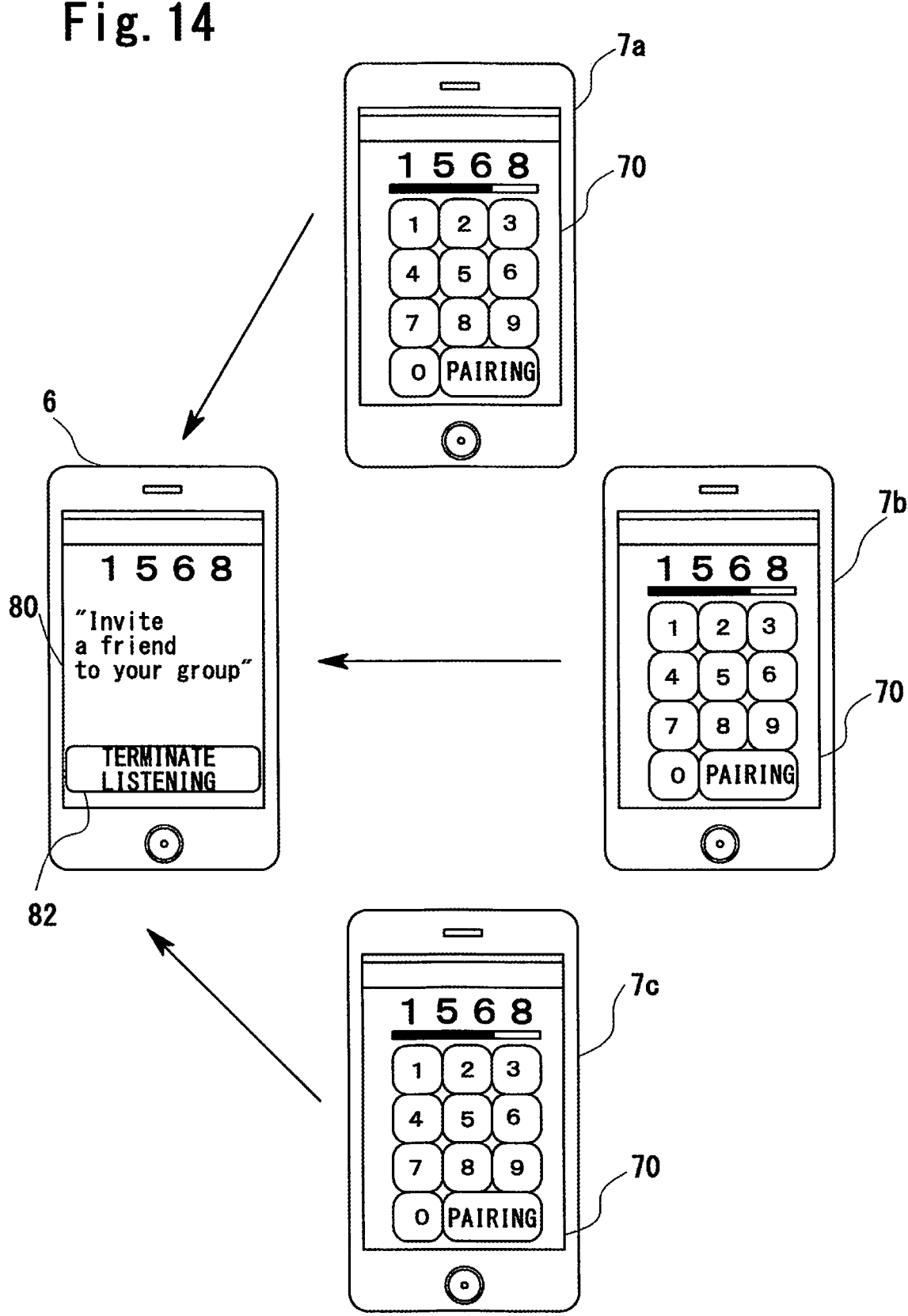
FIG. 14 is a drawing illustrating an example of display screens of the provider 6, a register 7a, a register 7b, and a register 7c in the pairing process.

As illustrated in FIG. 14, the multiple pairing mode is a mode that allows pairing between one provider 6 and a plurality of registers 7a, 7b, and 7c (multiple pairing). This mode can be regarded as a mode in which three single pairings (one-to-one pairing) including one between the provider 6 and the register 7a, one between the provider 6 and the register 7b, and one between the provider 6 and the register 7c are implemented by a one-time pairing process.

Whether the mode of the pairing is the multiple pairing mode or a single pairing mode (a mode that allows only one single pairing by a one-time pairing process) is set in advance (e.g., in step S1 illustrated in FIG. 5) and stored in the provider 6.

If it is determined in step S27 that the mode is the multiple pairing mode, information indicating the determination and containing a provider ID is transmitted to the register in question (e.g., the register 7a illustrated in FIG. 14), an indication indicating that the pairing has succeeded is displayed on the display screen 70 of the register 7a in question (not illustrated) (step S32), and the pairing process is continued.

In this case, description will be made later about a process in a case where an operator of the provider 6 determines that pairing with the remaining registers (e.g., the register 7b and the register 7c illustrated in FIG. 14) has succeeded, and a process in a case where the operator determines to cancel the pairing process.

On the other hand, if it is determined in step S27 that the mode is not the multiple pairing mode, the provider 6 next determines whether or not the mode of the pairing relating to the information is a safe pairing mode (step S28).

The safe pairing mode is a mode for performing pairing with more safety. Whether the mode of the pairing is the safe pairing mode or a normal pairing mode (a mode other than the safe pairing mode) is set in advance (e.g., in step S1 illustrated in FIG. 5) and stored in the provider 6.

If it is determined in step S28 that the mode is not the safe pairing mode, the provider 6 transmits a pairing listening termination command containing a provider ID to the server 4 (step S29).

Upon receiving the pairing listening termination command, the server 4 invalidates a record, of the records in the listening table 26, corresponding to the provider ID, (step S31). This is because the pairing corresponding to the provider ID has been established, and thus the record need not be kept. The invalidating the record is performed by a method of, for example, deleting the record or setting an invalid flag to the record.

At the same time, an indication indicating that the pairing has succeeded (not illustrated) is displayed on the display screen 80 of the provider 6 (step S30). In addition, information indicating the indication and containing a provider ID is transmitted to a register 7 being a counterpart of the pairing, an indication indicating that the pairing has succeeded (not illustrated) is displayed on the display screen 70 of the register 7 (step S32), and the pairing process is terminated.

Figure 9:
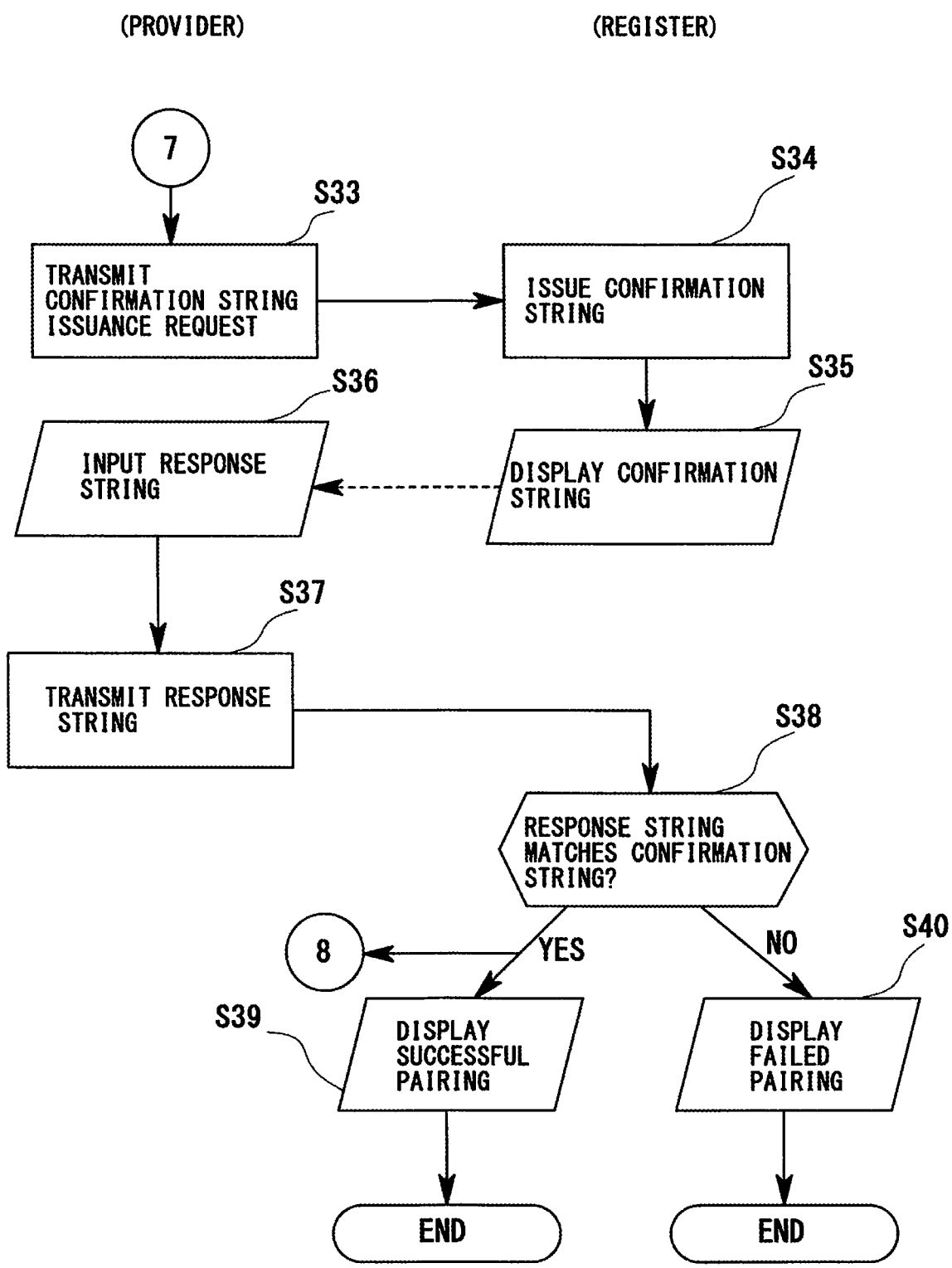
FIG. 9 is a flowchart illustrating the example of the flow of the pairing process in the present application.

On the other hand, if it is determined in step S28 that the mode is the safe pairing mode, the provider 6 transmits information containing a confirmation string issuance request and a provider ID to the register 7, as illustrated in FIG. 9 (step S33).

The register 7 having received the confirmation string issuance request issues a confirmation string (step S34) and displays the issued confirmation string (step S35).

Figure 15B:
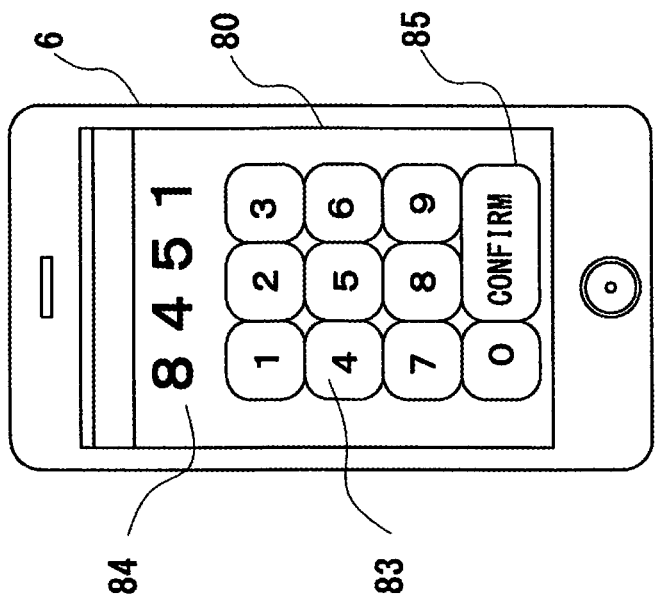
FIG. 15B is a drawing illustrating an example of the display screen of the provider 6 in the pairing process.
Figure 15A:
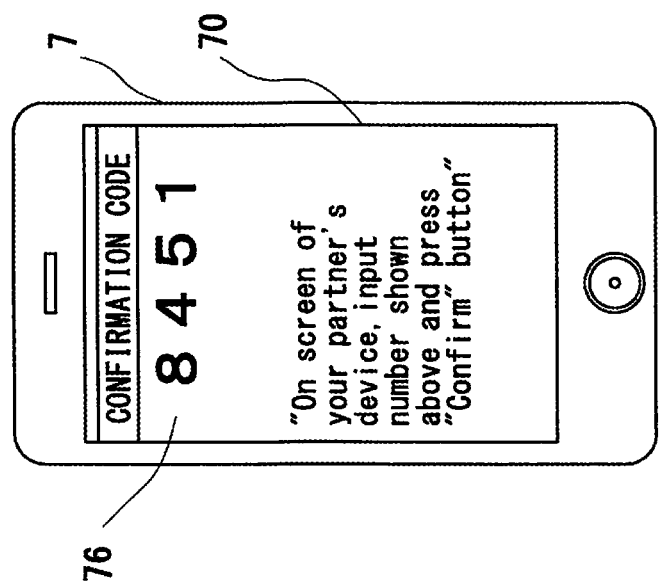
FIG. 15A is a drawing illustrating an example of the display screen of the register 7 in the pairing process.

As illustrated in FIG. 15A, a confirmation string "8451" is displayed in a confirmation string displaying section 76 on the display screen 70 of the register 7. A method for generating the confirmation string is not limited in particular, and for example, the confirmation string can be generated using a random number generating function of the register 7. The character type and the number of characters of the confirmation string are not limited in particular, but it is assumed that the confirmation string is a four-digit numeral.

Meanwhile, as illustrated in FIG. 15B, on the display screen 80 of the provider 6, an input key button 83 is displayed, allowing for input of a numeral. A confirmation button 85 is configured to be operable only when a response string is input and a four-digit numeral is displayed in a response string displaying section 84.

When the response string is input to the provider 6 by the operator of the provider 6 at the sight of the confirmation string "8451" displayed in the confirmation string displaying section 76 on the display screen 70 of the register 7 illustrated in FIG. 15A, and the confirmation button 85 is operated (step S36), the provider 6 transmits the input response string to the register 7 (step S37).

The register 7 compares the received response string with the confirmation string (step S38), and if they do not match, the registers 7 displays an indication indicating that the pairing has failed (not illustrated) (step S40).

On the other hand, if the response string and the confirmation string match in step S38, an indication indicating that the pairing has succeeded is displayed on the display screen 70 of the register 7 (not illustrated) (step S39), and the control is transferred to step S29 described above (see FIG. 8).

Figure 10:
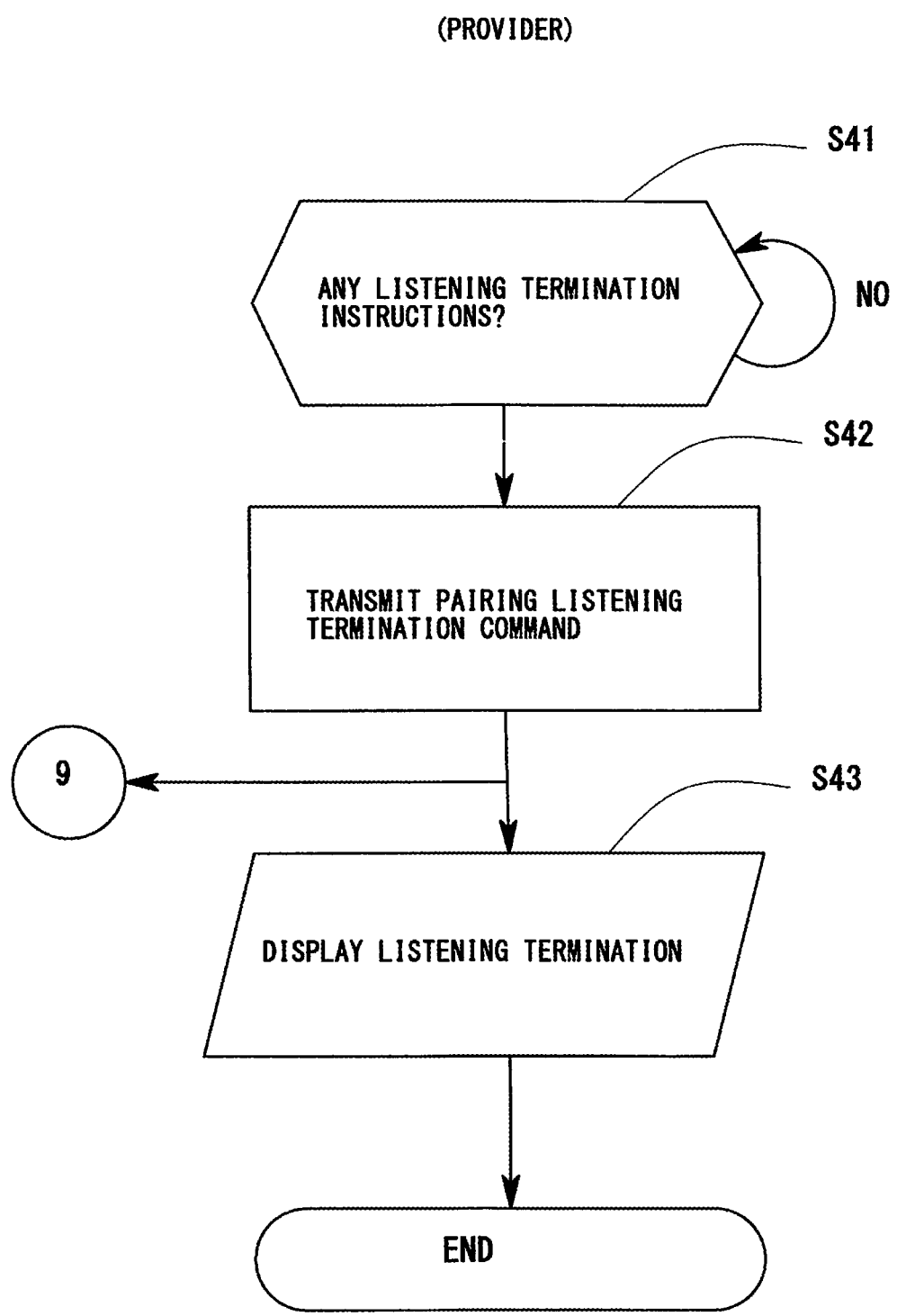
FIG. 10 is a flowchart illustrating the example of the flow of the pairing process in the present application.

Now, as illustrated in FIG. 10, the provider 6 monitors listening termination instructions (step S41).

In the multiple pairing mode illustrated in FIG. 14, if the operator of the provider 6 determines that pairing with the remaining registers (e.g., the register 7b and the register 7c illustrated in FIG. 14) has succeeded, or determines to cancel the pairing process, the pairing process can be canceled by operating a listening termination button 82. The same is true for a case of canceling the pairing process before the pairing is established, in the single pairing mode.

When the listening termination button 82 is operated, the provider 6 transmits a pairing listening termination command containing a provider ID to the server 4, and the control is transferred to step S31 described above (see FIG. 8) (step S42).

At the same time, an indication indicating that the listening has been terminated is displayed on the display screen 80 of the provider 6 (not illustrated) (step S43), and the pairing process is terminated.

The aforementioned embodiment is described by way of example about the case where, assuming that the provision string has a number of digits of n, and the character string constituting the stream seed created in advance has a number of characters of m (m>n), a consecutive n-digit character string is extracted from the character string constituting the stream seed starting from the leading digit, so as to form the provision string, and a starting point for extracting a consecutive n-digit character string is moved one digit to the right every lapse of a given amount of time, so as to cause the provision string to change every given amount of time.

For example, only a certain n-digit character string is first generated as a provision string, and the character string is subjected to carrying every given amount of time to delete a character at the leftmost digit of the character string, when any new character is generated and added to the rightmost digit of the character string.

In the aforementioned embodiment, description is made by way of example about the case where the carry of the acceptance string is configured to be performed in synchronization with the carry of the provision string, and the carry timing of the acceptance string can be configured to be performed irrespective of the carry timing of the provision string.

For example, when the number of digits of the acceptance string is n, the acceptance string can be subjected to carrying at a timing when a new character is input from the input device of the second apparatus with an already-input acceptance string (n digits) displayed.

FIG. 18 to FIG. 22 are flowcharts illustrating an example of a flow of an entity authenticating process utilizing the pairing process according to the present application (may be hereafter simply referred to as an "authentication process"). The pairing process in the authentication process differs from the aforementioned pairing process in that the operator of the provider 6 and the operator of the register 7 are identical.

Figure 23:
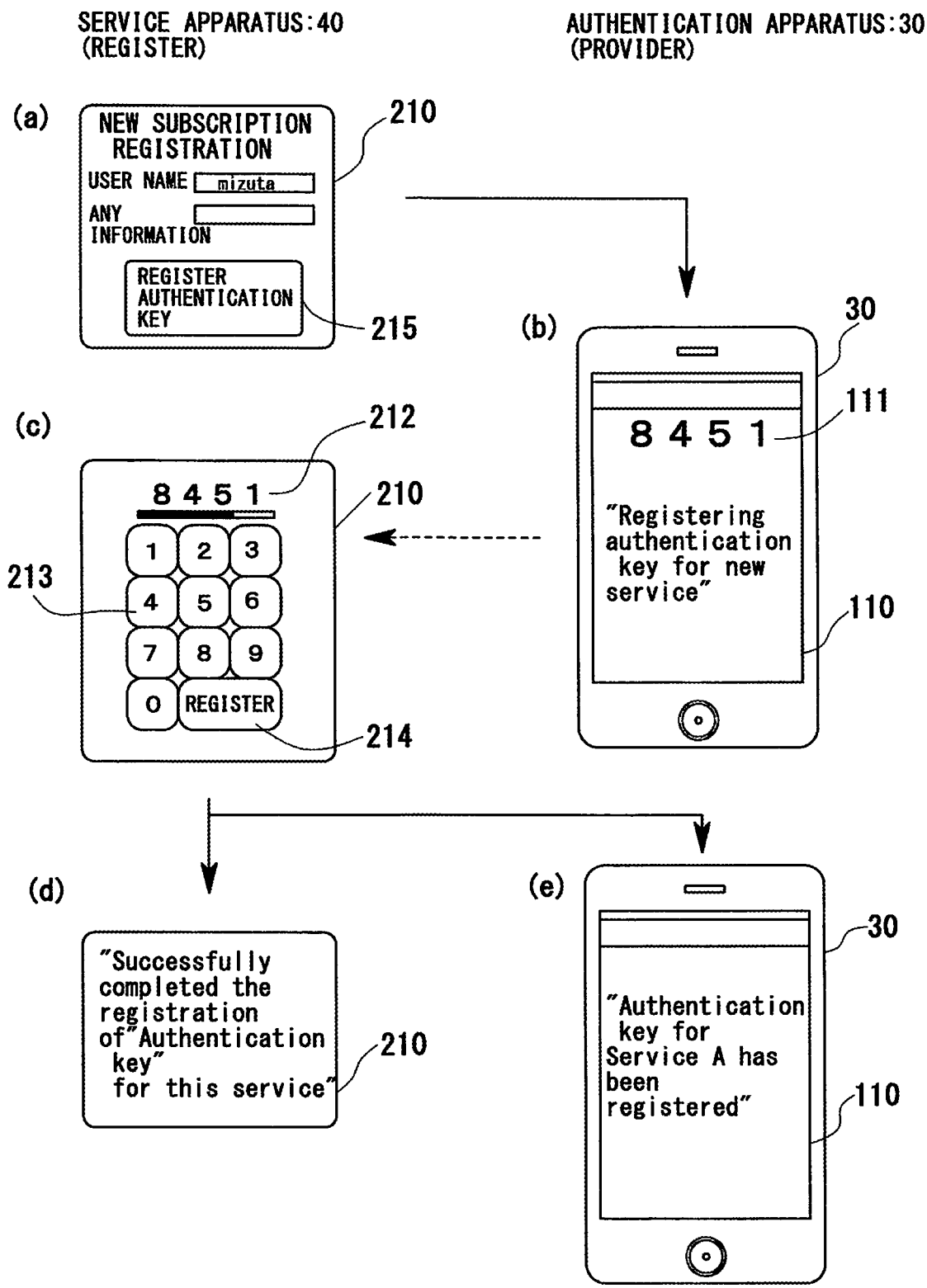
FIG. 23 is a drawing illustrating an example of how display screens of the authentication apparatus 30 and the service apparatus 40 transition in the authentication process.
Figure 24:
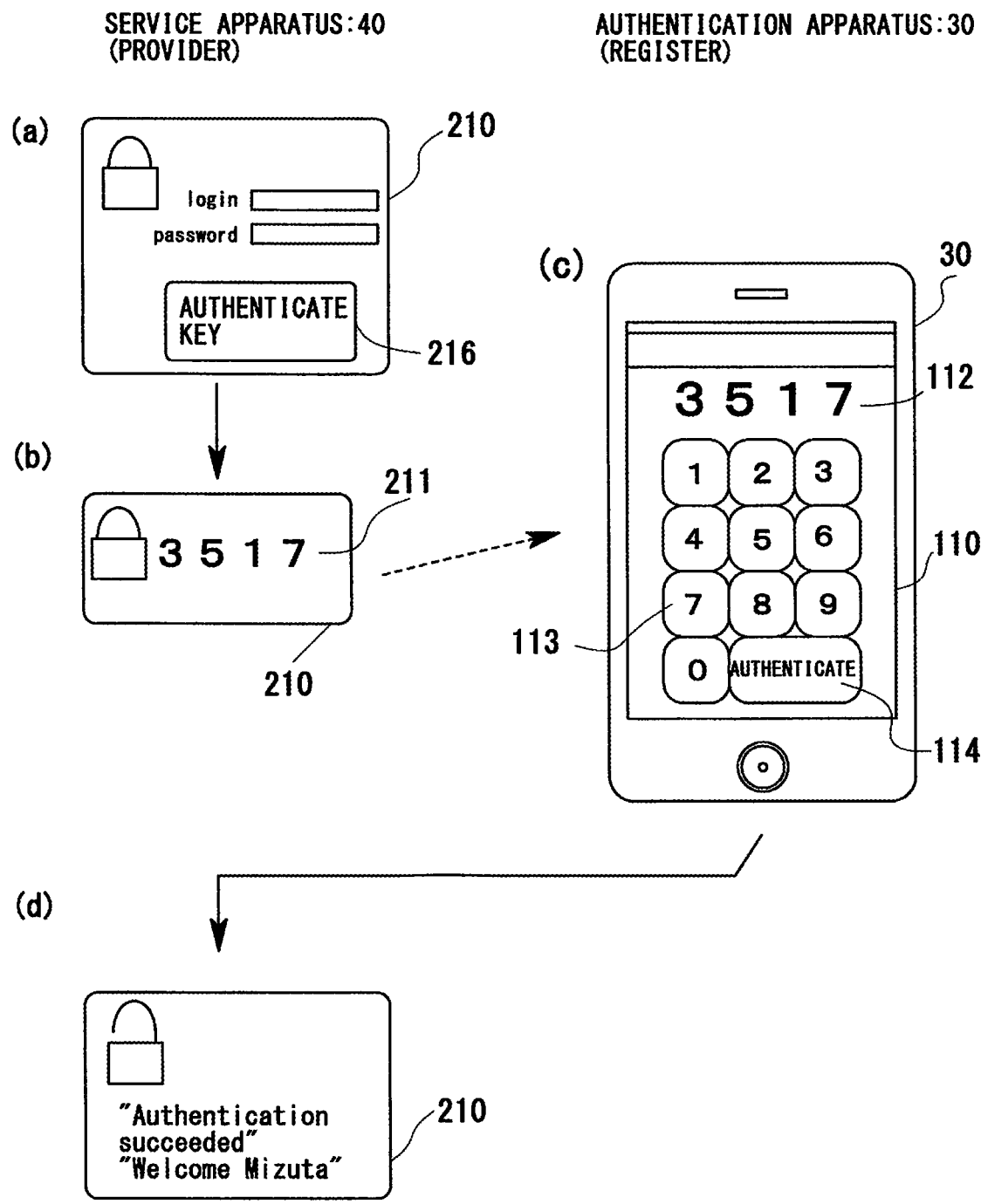
FIG. 24 is a drawing illustrating the example of how display screens of the authentication apparatus 30 and the service apparatus 40 transition in the authentication process.

FIG. 23 and FIG. 24 are drawings illustrating an example of how display screens of the authentication apparatus 30 and the service apparatus 40 transition in the authentication process. FIG. 25 and FIG. 26 are drawings illustrating an example of data configurations of the authentication side table 36 and the service side table 46, respectively.

Referring to FIG. 18 to FIG. 26, the authentication process will be described.

In the authentication process, an authentication registering process will be first described. The authentication registering process is a process in which the authentication apparatus 30 is registered as an authentication key at a time of using a specific service provided by the service apparatus 40 (may be hereafter referred to as a "service A").

Figure 18:
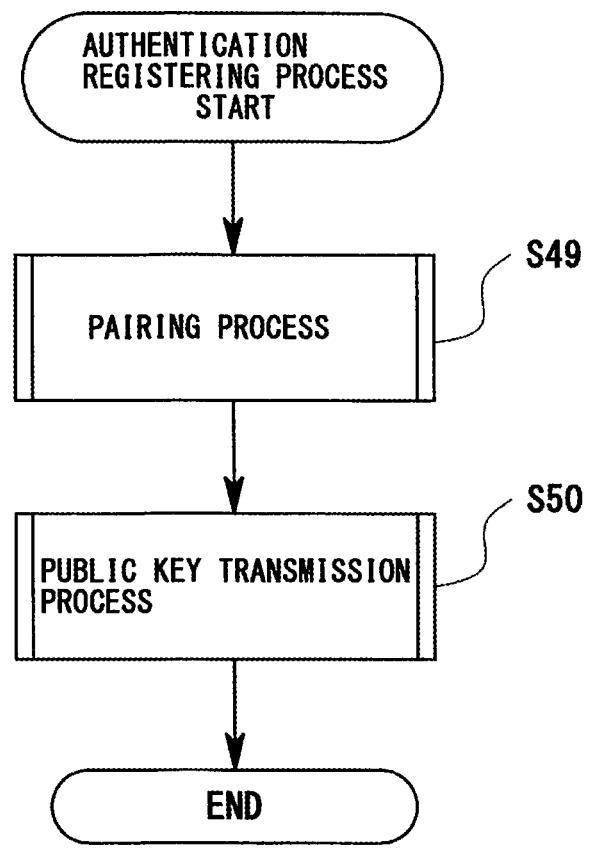
FIG. 18 is a flowchart illustrating an example of a flow of an authentication process using the pairing process in the present application.

As illustrated in FIG. 18, in the authentication registering process, a pairing process is first performed between the authentication apparatus 30 and the service apparatus 40 (step S49).

Examples of the pairing process performed in the authentication registering process include, without particular limitation, the same process as the pairing process described above, with the provider 6 serving as the authentication apparatus 30 and the register 7 serving as the service apparatus 40. It should be noted that the pairing process in step S49 involves, due to its nature, neither the multiple pairing mode (see step S27 in FIG. 8) nor the listening terminating process (see FIG. 10) in principle. In addition, display contents in authentication apparatus 30 and the service apparatus 40 also differ from the display contents of the provider 6 and the register 7 in the above-described embodiment.

As illustrated in (a) of FIG. 23, in the authentication registering process, a new subscription registration screen is first displayed on a display screen 210 of the service apparatus 40. On this screen, a user name and the other pieces of information necessary for registration are input. At this point, when an authentication key registration button 215 is operated, and at the same time an authentication key addition button (not illustrated) in a display screen 110 of the authentication apparatus 30 is operated, the pairing process is started.

When the pairing process is started, as illustrated in (b) of FIG. 23, a provision string is displayed in a provision string displaying section 111 on the display screen 110 of the authentication apparatus 30.

Perceiving this, an operator operates input key buttons 213 displayed on the display screen 210 of the service apparatus 40 illustrated in (c) of FIG. 23 to input an acceptance string. When a registration button 214 (equivalent to the pairing button 72 in FIG. 12A, etc.) is operated with the acceptance string in an acceptance string displaying section 212 displayed, the pairing process is performed.

When pairing is resultingly established between the authentication apparatus 30 and the service apparatus 40, a public key transmission process is automatically performed between the service apparatus 40 and the authentication apparatus 30 making use of a state allowing intercommunication bringing about by the pairing establishment, as illustrated in FIG. 18 (step S50).

Figure 19:
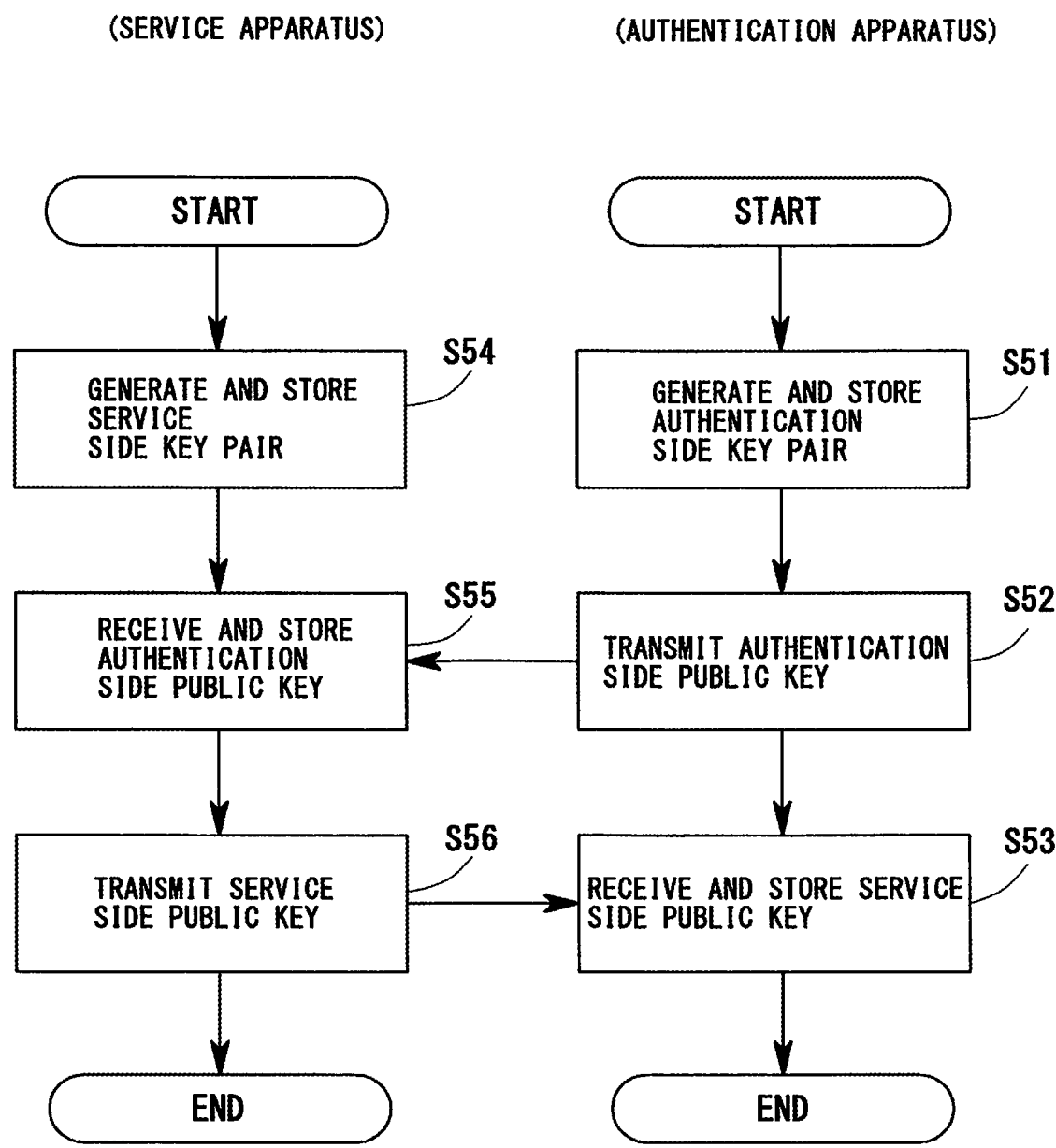
FIG. 19 is a flowchart illustrating the example of the flow of the authentication process using the pairing process in the present application.

FIG. 19 is a flowchart illustrating an example of a flow of the public key transmission process (step S50) in detail. In the public key transmission process, the service apparatus 40 generates a service side key pair, namely, a service side private key being a private key relating to the service A and a service side public key being a public key corresponding to the service side private key, and stores the service side key pair in the service side table 46 (step S54).

In the service side table 46 illustrated in FIG. 26, a pair of records each having an internal user ID field of "N/A (not applicable)" and having a key group ID field of the same value (e.g., "0") is equivalent to a service side key pair. In the pair of records, the key field of a record having a type field of "private key" shows a service side private key, and the key field of a record having a type field of "public key" shows a service side public key. In the service side table 46, two service side key pairs are stored.

Meanwhile, the authentication apparatus 30 generates an authentication side key pair, namely, an authentication side private key being a private key relating to the authentication apparatus 30 and an authentication side public key being a public key corresponding to the authentication side private key, stores the authentication side key pair in the authentication side table 36 (step S51), and transmits the generated authentication side public key to the service apparatus 40 (step S52).

In the authentication side table 36 illustrated in FIG. 25, a pair of records each having a service ID field, a service name field, and an internal user ID field that are all "N/A (not applicable)", and having a key group ID field of the same value (e.g., "0") corresponds to the authentication side key pair. In the pair of records, the key field of a record having a type field of "private key" shows an authentication side private key, and the key field of a record having a type field of "public key" shows an authentication side public key. In the authentication side table 36, two authentication side key pairs are stored.

Upon receiving the authentication side public key, the service apparatus 40 generates an internal user ID being an identification marker for the authentication apparatus 30 relating to the service A, and stores the received authentication side public key, associating it with the internal user ID, in the service side table 46 (step S55).

In the service side table 46 illustrated in FIG. 26, a key field in a record each having an internal user ID field of a value other than "N/A (not applicable)" (e.g., "BBB") show an authentication side public key corresponding to the internal user ID.

In the service side table 46, three authentication side public keys are stored. Of the records corresponding to these authentication side public keys, records each having a key group ID field of the same value (e.g., "0") are managed as belonging to the same group, and as will be described later, in the authentication performing process, a validity inspecting process is performed using the authentication side public keys corresponding to the internal user ID together with a service side private key having the same key group ID field.

Furthermore, the service apparatus 40 transmits the service side public key generated in step S54, together with the service ID being an identification marker in the service A, the service name corresponding to the service ID, and the above-described internal user ID, to the authentication apparatus 30 (step S56).

Upon receiving the service side public key, the service ID, the service name, and the internal user ID from the service apparatus 40, the authentication apparatus 30 stores them, associating them with one another, in the authentication side table 36 (step S53).

In the authentication side table 36 illustrated in FIG. 25, the key field of a record having a service ID field, a service name field, and an internal user ID field of values other than "N/A (not applicable)" (e.g., "AAA", "Service A", and "BBB") shows a service side public key corresponding to the service ID.

In the authentication side table 36, three service side public keys are stored. Of the records corresponding to these service side public keys, records each having a key group ID field of the same value (e.g., "0") are managed as belonging to the same group, and as will be described later, in the authentication performing process, the validity inspecting process is performed using the service side public keys corresponding to the service ID together with an authentication side private key having the same key group ID field.

When the process illustrated in FIG. 18 is completed, as illustrated in (d) and (e) of FIG. 23, indications indicating that the authentication registering process has been completed are displayed on the display screen 210 of the service apparatus 40 and on display screen 110 of the authentication apparatus 30, respectively, and the authentication registering process (see FIG. 18) is terminated.

The process illustrated in FIG. 18 is configured so as to generate a plurality of service side key pairs and manage the service side key pairs and one, or two or more authentication side public keys corresponding to the service side key pairs as belonging to the same group, but this does not limit the present invention. For example, different service side key pairs may be generated and stored for different authentication apparatuses 30, or a common service side key pair can be used for all different authentication apparatuses 30. In the latter case, once performing the process in step S54 dispenses with performing the process in each authentication registering process.

The process illustrated in FIG. 18 is configured so as to generate a plurality of authentication side key pairs and manage the authentication side key pair and one, or two or more service side public keys corresponding to the authentication side key pair as belonging to the same group, but this does not limit the present invention. For example, different authentication side key pairs may be generated and stored for different service apparatuses 40, or a common authentication side key pair can be used for all different service apparatuses 40. In the latter case, once performing the process in step S51 dispenses with performing the process in each authentication registering process.

The authentication performing process will be next described. The authentication performing process is a process of performing authentication for using the service A provided by the service apparatus 40 using the authentication apparatus 30 that has been registered as the authentication key through the authentication registering process.

Figure 20:
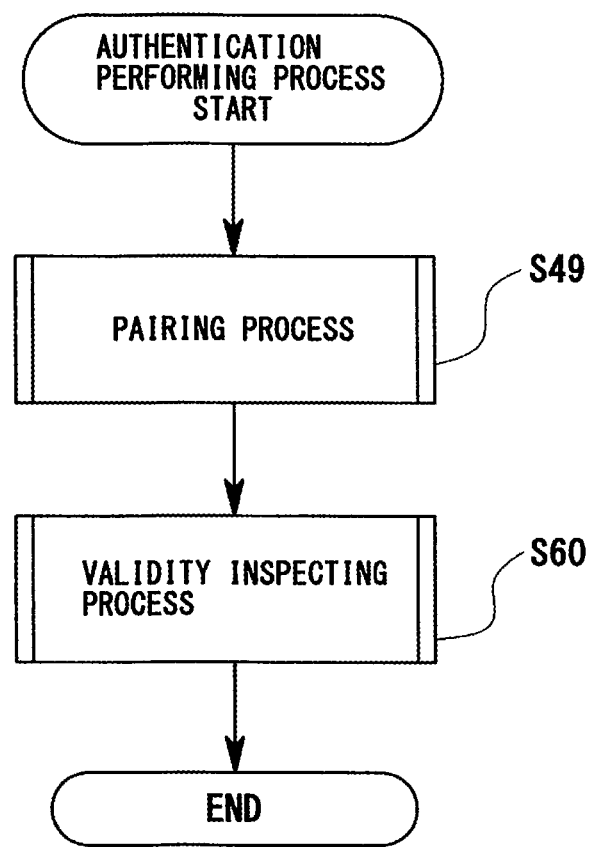
FIG. 20 is a flowchart illustrating the example of the flow of the authentication process using the pairing process in the present application.

As illustrated in FIG. 20, in the authentication performing process, a pairing process is first performed between the authentication apparatus 30 and the service apparatus 40 (step S49).

Examples of the pairing process performed in the authentication performing process include, without particular limitation, the same process as the pairing process in the authentication registering process, with the provider 6 serving as the service apparatus 40 and the register 7 serving as the authentication apparatus 30.

As illustrated in (a) of FIG. 24, in the authentication performing process, an authentication start screen is first displayed on the display screen 210 of the service apparatus 40. When a key authentication button 216 is operated on this screen, the pairing process is started.

In this example, inputting a login ID and a password on the above-described authentication start screen allows the authentication to be performed without using the authentication apparatus 30.

When the pairing process is started by the operation of the key authentication button 216, as illustrated in (b) of FIG. 24, a provision string is displayed in a provision string displaying section 211 on the display screen 210 of the service apparatus 40.

Perceiving this, an operator operates input key buttons 113 displayed on the display screen 110 of the authentication apparatus 30 illustrated in (c) of FIG. 24 to input an acceptance string. When an authentication button 114 (equivalent to the pairing button 72 in FIG. 12A, etc.) is operated with the acceptance string in an acceptance string displaying section 112 displayed, the pairing process is performed.

When pairing is resultingly established between the authentication apparatus 30 and the service apparatus 40, a validity inspecting process is automatically performed between the service apparatus 40 and the authentication apparatus 30 making use of a state allowing intercommunication bringing about by the pairing establishment, as illustrated in FIG. 20 (step S60).

Figure 21:
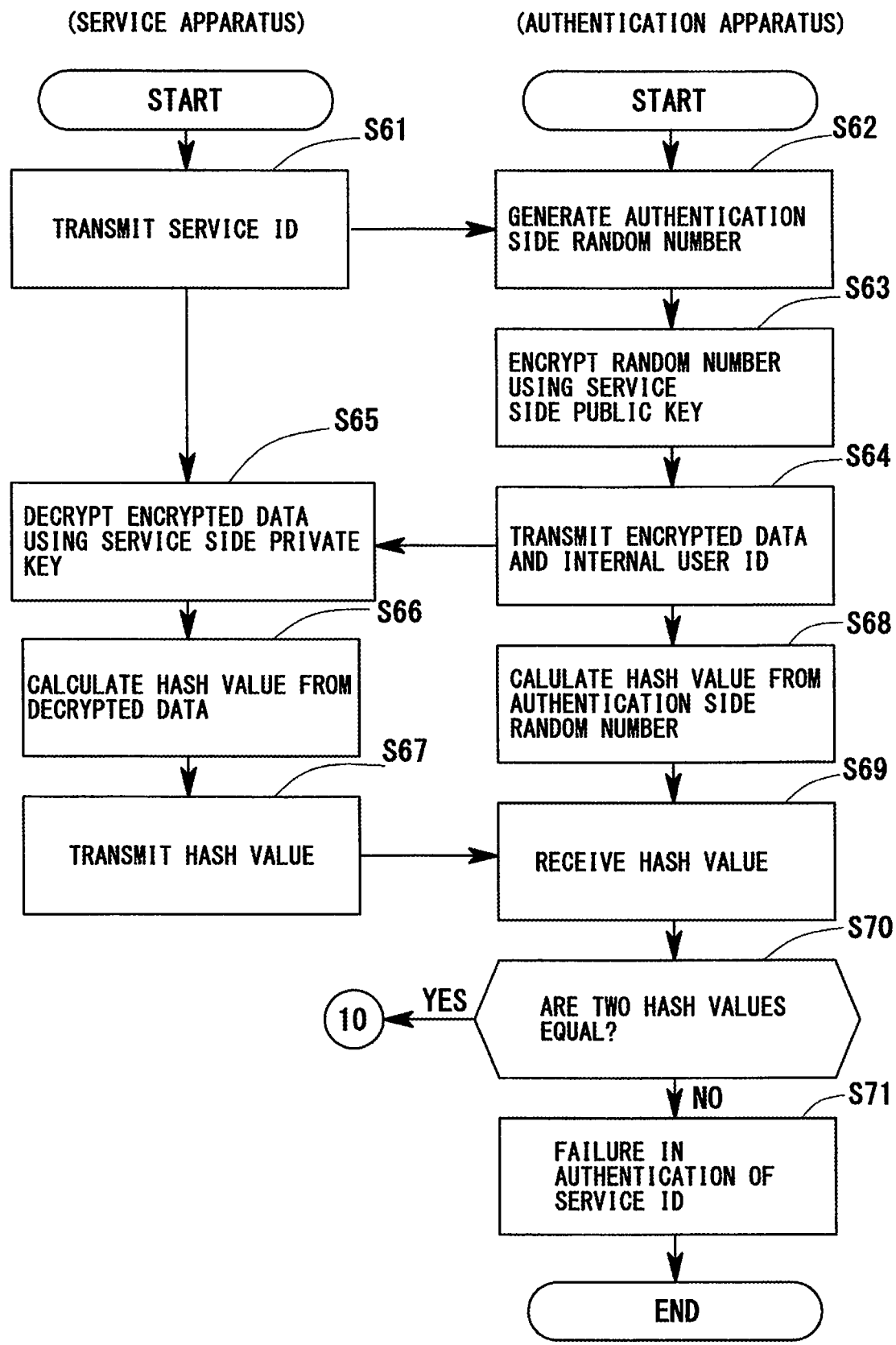
FIG. 21 is a flowchart illustrating the example of the flow of the authentication process using the pairing process in the present application.
Figure 22:
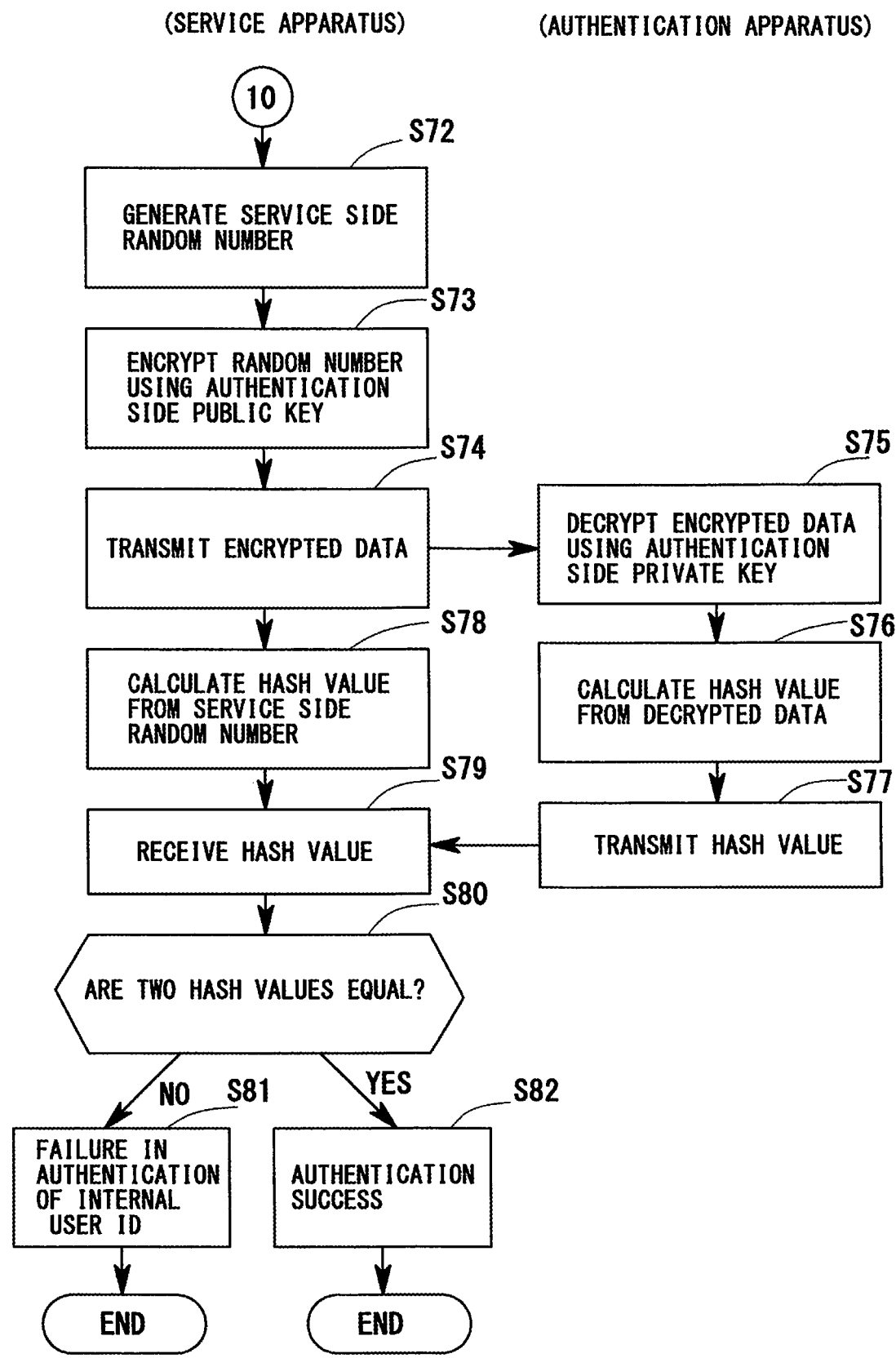
FIG. 22 is a flowchart illustrating the example of the flow of the authentication process using the pairing process in the present application.

FIG. 21 and FIG. 22 are flowcharts illustrating an example of a flow of the validity inspecting process (step S60) in detail. In the validity inspecting process, the service apparatus 40 transmits information to require authentication, with the specification of a service ID relating to the service A included therein, to the authentication apparatus 30 (step S61).

Upon receiving the information to require the authentication, the authentication apparatus 30 generates authentication side original data in a form of a random number (step S62). This random number is referred to as an authentication side random number. Of course, the authentication side original data is not limited to the random number and may be any data prepared in the authentication apparatus 30.

The authentication apparatus 30 reads a service side public key and an internal user ID corresponding to the received service ID from the authentication side table 36 of the authentication apparatus 30 (may be hereafter simply referred to as an "authentication apparatus 30") and encrypts the authentication side random number using the read service side public key (step S63). This encrypted authentication side random number is authentication side encrypted data.

The authentication apparatus 30 transmits the above-described authentication side encrypted data and the read internal user ID to the service apparatus 40 (step S64).

Upon receiving the authentication side encrypted data and the internal user ID, the service apparatus 40 decrypts the received authentication side encrypted data using a service side private key stored in the service side table 46 (step S65). Out of a plurality of service side private keys stored in the service side table 46, the service side private key used in the decryption is a service side private key having the same key group ID field as that of an authentication side public key corresponding to the received internal user ID. This decrypted authentication side encrypted data is authentication side decrypted data.

The service apparatus 40 subjects the authentication side decrypted data to predetermined computation to obtain authentication side computed data (step S66). In this example, the predetermined computation is configured to perform computation using a function including an irreversible one-way function, for example, a specific hash function. Therefore, in step S66, the computation using the specific hash function is performed on the authentication side decrypted data to calculate the authentication side computed data in a form of a hash value.

Of course, the predetermined computation is not limited to the computation using the hash function. For example, the authentication side computed data can be the same value as the authentication side decrypted data. In this case, the predetermined computation can be regarded as computation multiplying "1".

The service apparatus 40 transmits the calculated hash value to the authentication apparatus 30 (step S67).

The authentication apparatus 30 receives the hash value (step S69) while calculating a hash value obtained by subjecting the authentication side random number generated in step S62 to computation using the same hash function as the hash function used in step S66 (step S68), and determines whether or not these two hash values match (step S70).

If the two hash values do not match, the authentication apparatus 30 determines that the authentication of the service ID has failed (the service ID is not genuine) and terminates the authentication performing process (step S71).

On the other hand, if the two hash values match in step S70, it is determined that the authentication of the service ID has succeeded (the service ID is genuine), information to require next authentication is transmitted to the service apparatus 40, and the control is transferred to step S72 illustrated in FIG. 22.

A process of step S72 to step S81 is substantially the same as the process of step S62 to step S71 described above, where however the roles of the authentication apparatus 30 and the service apparatus 40 are reversed.

Specifically, in step S72, the service apparatus 40 generates service side original data in a form of a random number (step S72). This random number is referred to as a service side random number. Of course, the service side original data is not limited to the random number and may be any data prepared in the service apparatus 40.

The service apparatus 40 reads an authentication side public key corresponding to the internal user ID that is received from the authentication apparatus 30 in step S65, from the service side table 46 of the service apparatus 40 (may be hereafter simply referred to as a "service apparatus 40"), and encrypts the service side random number using the read authentication side public key (step S73). This encrypted service side random number is service side encrypted data.

The service apparatus 40 transmits the above-described service side encrypted data to the authentication apparatus 30 (step S74).

The authentication apparatus 30 decrypts the received service side encrypted data using an authentication side private key stored in the authentication side table 36 (step S75). Out of a plurality of authentication side private keys stored in the authentication side table 36, the authentication side private key used in the decryption is an authentication side private key having the same key group ID field as that of a service side public key corresponding to the service ID received in step S62. This decrypted service side encrypted data is service side decrypted data.

The authentication apparatus 30 subjects the service side decrypted data to predetermined computation to obtain service side computed data (step S76). In this example, the predetermined computation is configured to perform computation using a function including an irreversible one-way function, for example, a specific hash function. Therefore, in step S76, the computation using the specific hash function is performed on the service side decrypted data to calculate the service side computed data in a form of a hash value.

Of course, the predetermined computation is not limited to the computation using the hash function. For example, the service side computed data can be the same value as the service side decrypted data. In this case, the predetermined computation can be regarded as computation multiplying "1".

The authentication apparatus 30 transmits the calculated hash value to the service apparatus 40 (step S77).

The service apparatus 40 receives the hash value (step S79) while calculating a hash value obtained by subjecting the service side random number generated in step S72 to computation using the same hash function as the hash function used in step S76 (step S78), and determines whether or not these two hash values match (step S80).

If the two hash values do not match, the service apparatus 40 determines that the authentication of the internal user ID has failed (the internal user ID is not genuine) and terminates the authentication performing process (step S81).

On the other hand, if the two hash values match in step S80, it is determined that the authentication of the internal user ID has succeeded (the internal user ID is genuine) and determined that the authentication performing process illustrated in FIG. 20 has succeeded (step S82).

When the authentication performing process succeeds, an indication indicating that the authentication has succeeded is displayed on the display screen 210 of the service apparatus 40 as illustrated in (d) of FIG. 24, and the authentication performing process (see FIG. 20) is terminated.

After this, a user (operator) is allowed to use the service A provided by the service apparatus 40.

In the aforementioned embodiment, the validity inspecting process (step S60 in FIG. 20) is configured to perform both of the validity inspecting process of a service ID (step S61 to step S71 in FIG. 21) and the validity inspecting process for an internal user ID (step S72 to step S82 in FIG. 22), but this does not limit the present invention.

According to the kind, nature, and use case of a service to be provided, the validity inspecting process (step S60 in FIG. 20) can be configured to perform only one of the validity inspecting process of a service ID (step S61 to step S71 in FIG. 21) and the validity inspecting process for an internal user ID (step S72 to step S82 in FIG. 22).

The form of the authentication according to the present invention is not limited in particular. The present invention is applicable to any kind of authentication, for example, use authentication for software, login authentication for a website, settlement service authentication in online shopping or the like (including transition to a settlement service by redirection).

A service can be configured so that part of the service involves further authentication performing process in use of the service having succeeded in the authentication performing process (see FIG. 20) according to the present invention.

For example, in the case where login authentication according to the present invention for a website has succeeded, and the website is used by the service apparatus 40, when a user requires the provision of a certain important service on the website (e.g., purchase and sell of goods), the confirmation as to whether to accept or decline the provision of the certain important service is displayed on the authentication apparatus 30, and when an input indicating the acceptance from the authentication apparatus 30 is made, the authentication performing process according to the present invention is performed once more.

In this case, since the pairing process (see step S49) by the former authentication performing process (see FIG. 20) has been completed, and communication between the service apparatus 40 and the authentication apparatus 30 has been established, the pairing process need not be performed again in the latter authentication performing process, and performing the same process as the validity inspecting process (see step S60) suffices.

The aforementioned authentication process is described by way of example about the case where the authentication apparatus 30 is implemented in a form of an actual machine, but this does not limit the present invention. The authentication apparatus 30 can be implemented in a form of a virtual machine. In this case, the service apparatus 40 and the authentication apparatus 30 are allowed to exist together in the same physical machine.

The aforementioned authentication process is described by way of example about the case where, in the information communication system according to any one of first to fourth inventions of the present application (to be described later), the authentication for making the specific service available is performed on a precondition that pairing is established between a service apparatus and an authentication apparatus, with one of the first and the second apparatus serving as the service apparatus, and the other is made to serve as the authentication apparatus, the service apparatus being an apparatus that provides the specific service, the authentication apparatus being an apparatus that performs the authentication at a time of using the specific service, but this does not limit the authentication process.

The authentication for making the specific service available can be configured to be performed on a precondition that communication is established between the service apparatus and the authentication apparatus specified as counterparts, using some means (establishment of pairing in a broad sense).

In this case, the pairing between the service apparatus and the authentication apparatus may be established over an information communication network such as the Internet, and more generally, the pairing can be established via information communication means.

Here, the information communication means refers to communication means, of either wired or wireless, for transmitting information converted into an electric signal, optical signal, or the like. Examples of the information communication means include a computer network such as a wide area network (WAN) represented by the Internet, and a local area network (LAN), a communication line such as a telephone line (including a mobile telephone line), and a private line, near field communication (NFC) such as Bluetooth, communication using infrared light or the like, communication using a communication cable, communication through contact between apparatuses, or a combination thereof.

Specifically, the same process as the authentication registering process (FIG. 18) or the authentication performing process (FIG. 20) can be implemented by performing a process equivalent to the pairing process (step S49 in FIG. 18 and FIG. 20) (the process of establishing communication between the service apparatus and the authentication apparatus specified as counterparts) and then performing the public key transmission process (step S50 in FIG. 18) or the validity inspecting process (step S60 in FIG. 20), by using some means.

In this case, the present invention can be understood as follows.

[Invention A]

An information communication system including a service apparatus and an authentication apparatus, the service apparatus being an apparatus that provides a specific service, the authentication apparatus being an apparatus that performs authentication at a time of using the specific service and is capable of communication with the service apparatus via information communication means, the information communication system functioning as a system that performs authentication for making the specific service available on a precondition that pairing is established between the service apparatus and the authentication apparatus, wherein the authentication apparatus includes an authentication side controller including an authentication side registering unit that generates an authentication side private key being a private key to be used by the authentication apparatus and an authentication side public key being a public key corresponding to the authentication side private key, stores the authentication side private key, and transmits the authentication side public key to the service apparatus, the service apparatus includes a service side controller including a service side registering unit that, upon receiving the authentication side public key from the authentication apparatus, generates an internal user ID being an identification marker for the authentication apparatus in the specific service, stores the authentication side public key associating the authentication side public key with the internal user ID, and transmits the internal user ID to the authentication apparatus, the service side controller includes a service side encrypting unit that, upon receiving information to request authentication with the internal user ID specified, from the authentication apparatus, transmits service side encrypted data to the authentication apparatus, the service side encrypted data being data obtained by encrypting service side original data being any data prepared in the service apparatus, using the authentication side public key that corresponds to the internal user ID and is stored in the service side registering unit, the authentication side controller includes an authentication side decrypting unit that transmits service side computed data obtained by performing predetermined computation on service side decrypted data, to the service apparatus, the service side decrypted data being data obtained by decrypting the service side encrypted data received from the service apparatus, using the authentication side private key that is stored in the authentication side registering unit, and the service side controller includes an internal user ID genuineness determining unit that determines that the internal user ID is genuine when the service side computed data received from the authentication apparatus matches data obtained by performing the predetermined computation on the service side original data.

[Invention B]

The information communication system according to the invention A, wherein the service side registering unit further generates a service side private key being a private key to be used by the service apparatus and a service side public key being a public key corresponding to the service side private key, stores the service side private key, and transmits the service side public key together with a service ID that is an identification marker for the service apparatus in the specific service, to the authentication apparatus, upon receiving the service side public key from the service apparatus, the authentication side registering unit further stores the service side public key associating it with the service ID, the authentication side controller includes an authentication side encrypting unit that, upon receiving information to request authentication with the service ID specified, from the service apparatus, transmits authentication side encrypted data to the service apparatus, the authentication side encrypted data being data obtained by encrypting authentication side original data being any data prepared in the authentication apparatus, using the service side public key that corresponds to the service ID and is stored in the authentication side registering unit, the service side controller includes a service side decrypting unit that transmits authentication side computed data obtained by performing predetermined computation on authentication side decrypted data, to the authentication apparatus, the authentication side decrypted data being data obtained by decrypting the authentication side encrypted data received from the authentication apparatus, using the service side private key that is stored in the service side registering unit, and the authentication side controller includes a service ID genuineness determining unit that determines that the service ID is genuine when the authentication side computed data received from the service apparatus matches data obtained by performing the predetermined computation on the authentication side original data.

[Invention C]

An information communication system including a service apparatus being an apparatus that provides a specific service, an authentication apparatus being an apparatus that performs authentication at a time of using the specific service and is capable of communication with the service apparatus via information communication means, the system performing authentication for making the specific service available on a precondition that pairing is established between the service apparatus and the authentication apparatus, wherein the service apparatus includes a service side controller including a service side registering unit that generates a service side private key being a private key to be used by the service apparatus and a service side public key being a public key corresponding to the service side private key, stores the service side private key, and transmits the service side public key together with a service ID that is an identification marker for the service apparatus in the specific service, to the authentication apparatus, the authentication apparatus includes an authentication side controller including an authentication side registering unit that, upon receiving the service side public key from the service apparatus, stores the service side public key associating the service side public key with the service ID, the authentication side controller includes an authentication side encrypting unit that, upon receiving information to request authentication with the service ID specified, from the service apparatus, transmits authentication side encrypted data to the service apparatus, the authentication side encrypted data being data obtained by encrypting authentication side original data being any data prepared in the authentication apparatus, using the service side public key that corresponds to the service ID and is stored in the authentication side registering unit, the service side controller includes a service side decrypting unit that transmits authentication side computed data obtained by performing predetermined computation on authentication side decrypted data, to the authentication apparatus, the authentication side decrypted data being data obtained by decrypting the authentication side encrypted data received from the authentication apparatus, using the service side private key that is stored in the service side registering unit, and the authentication side controller includes a service ID genuineness determining unit that determines that the service ID is genuine when the authentication side computed data received from the service apparatus matches data obtained by performing the predetermined computation on the authentication side original data.

[Invention D]

The service apparatus used in the information communication system according to any one of Inventions A to C.

[Invention E]

The authentication apparatus used in the information communication system according to any one of Inventions A to C.

[Invention F]

A program for causing a computer to function as the service side controller of the service apparatus according to the Invention D, or as the authentication side controller of the authentication apparatus according to Invention E.

[Invention G]

A recording medium in which the program according to Invention F is stored.

[Invention H]

An information communication method using an information communication system including a service apparatus being an apparatus that provides a specific service, an authentication apparatus being an apparatus that performs authentication at a time of using the specific service and is capable of communication with the service apparatus via information communication means, the information communication system performing authentication for making the specific service available on a precondition that pairing is established between the service apparatus and the authentication apparatus, the information communication method including:

an authentication side registering step, by the authentication apparatus, of generating an authentication side private key being a private key to be used by the authentication apparatus and an authentication side public key being a public key corresponding to the authentication side private key, storing the authentication side private key, and transmitting the authentication side public key to the service apparatus;

a service side registering step, by the service apparatus, of generating, upon receiving the authentication side public key from the authentication apparatus, an internal user ID being an identification marker for the authentication apparatus in the specific service, storing the authentication side public key associating the authentication side public key with the internal user ID, and transmitting the internal user ID to the authentication apparatus;

a service side encrypting step, by the service apparatus, of transmitting, upon receiving information to request authentication with the internal user ID specified, from the authentication apparatus, service side encrypted data to the authentication apparatus, the service side encrypted data being data obtained by encrypting service side original data being any data prepared in the service apparatus, using the authentication side public key that corresponds to the internal user ID and is stored in the service side registering unit;

an authentication side decrypting step, by the authentication apparatus, of transmitting service side computed data obtained by performing predetermined computation on service side decrypted data, to the service apparatus, the service side decrypted data being data obtained by decrypting the service side encrypted data received from the service apparatus, using the authentication side private key that is stored in the authentication side registering unit; and an internal user ID genuineness determining step, by the service apparatus, of determining that the internal user ID is genuine when the service side computed data received from the authentication apparatus matches data obtained by performing the predetermined computation on the service side original data.

[Invention I]

An information communication method using an information communication system including a service apparatus being an apparatus that provides a specific service, an authentication apparatus being an apparatus that performs authentication at a time of using the specific service and is capable of communication with the service apparatus via information communication means, the information communication system performing authentication for making the specific service available on a precondition that pairing is established between the service apparatus and the authentication apparatus, the information communication method including:

a service side registering step, by the service apparatus, of generating a service side private key being a private key to be used by the service apparatus and a service side public key being a public key corresponding to the service side private key, storing the service side private key, and transmitting the service side public key together with a service ID that is an identification marker for the service apparatus in the specific service, to the authentication apparatus;

an authentication side registering step, by the authentication apparatus, of storing, upon receiving the service side public key from the service apparatus, the service side public key associating the service side public key with the service ID, an authentication side encrypting step, by the authentication apparatus, of transmitting, upon receiving information to request authentication with the service ID specified, from the service apparatus, authentication side encrypted data to the service apparatus, the authentication side encrypted data being data obtained by encrypting authentication side original data being any data prepared in the authentication apparatus, using the service side public key that corresponds to the service ID and is stored in the authentication side registering unit;

a service side decrypting step, by the service apparatus, of transmitting authentication side computed data obtained by performing predetermined computation on authentication side decrypted data, to the authentication apparatus, the authentication side decrypted data being data obtained by decrypting the authentication side encrypted data received from the authentication apparatus, using the service side private key that is stored in the service side registering unit; and a service ID genuineness determining step, by the authentication apparatus, of determining that the service ID is genuine when the authentication side computed data received from the service apparatus matches data obtained by performing the predetermined computation on the authentication side original data.

Step S1, step S2, and step S8 to step S11 illustrated in FIG. 5, step S27 to step S30 illustrated in FIG. 8, step S33, step S36, and step S37 illustrated in FIG. 9, and step S41 to step S43 illustrated in FIG. 10 correspond to the first controller 10 of the first apparatus 6 illustrated in FIG. 2.

Among these steps, step S2, step S9 to step S11, and step S36 correspond to the pairing provision processing unit 11.

Among these steps, step S36 corresponds to the response string acquisition processing unit 12.

Step S12 to step S19 illustrated in FIG. 6, step S22, step S25, and step S26 illustrated in FIG. 7, step S32 illustrated in FIG. 8, and step S34, step S35, and step S38 to step S40 illustrated in FIG. 9 correspond to the second controller 15 of the second apparatus 7 illustrated in FIG. 2.

Among these steps, step S15 to step S19 and step S35 correspond to the pairing acceptance processing unit 16.

Among these steps, step S15, step S17, and step S18 correspond to the carry processing unit 17, and step S35 corresponds to the confirmation string display processing unit 18.

Step S3 to step S7 illustrated in FIG. 5, step S20 to step S24 illustrated in FIG. 7, and step S31 illustrated in FIG. 8 correspond to the server side controller 20 of the server apparatus 4 illustrated in FIG. 2.

Among these steps, step S20, step S21, step S23 to step S24, and step S31 correspond to the pairing determination processing unit 21.

Among these steps, step S23 and step S24 correspond to the re-pairing performing instruction processing unit 22.

In this embodiment, as a recording medium which stores programs on the side of the server apparatus 4 of the information communication system 2, there is illustrated a hard disk attached to a HDD. As a recording medium which stores programs on the side of the first apparatus 6 or the second apparatus 7, there is illustrated a flash memory attached to a SSD. However, a recording medium which stores programs shall not be limited thereto. A recording medium which stores programs includes, for example, an external memory card, a CD-ROM, a DVD-ROM, a flexible disk and an electromagnetic tape. A main storage device can also be used as a recording medium which stores programs.

There are no particular restrictions on a distributing mode of a program. The program may be distributed in a state that the program is stored in a recording medium or the program may be distributed via wire or wireless information communication means.

There are no particular restrictions on a recording mode of a program. The program may be stored in a recording medium or distributed so as to be directly executed. Alternatively, for example, the program may be stored in a recording medium or distributed in a state of compression so as to be used after decompression.

In each of the above described embodiments, a description has been given of a case where a computer is used to realize each of the functions shown in FIG. 2 or FIG. 3. However, it is also acceptable that a part or a whole of the functions may be configured by using hardware logic.

Further, the above described block diagrams, arrangements of hardware, flow charts, arrangements of database (Tables), arrangements of display screen etc., are only examples. The present application shall not be, however, limited thereto.

An information communication system according to the first invention of the present application is an information communication system including a plurality of apparatuses connected to an information communication network and a server apparatus connected to the information communication network, characterized in that a first apparatus of the plurality of apparatuses includes a first controller including a pairing provision processing unit that performs a pairing providing process of displaying a provision string on a display device of the first apparatus and transmitting pairing provision information containing the provision string to the server apparatus, the provision string being a character string of a given number of digits that is configured to change every given amount of time in such a manner that, every given amount of time, the character string is subjected to carrying and a new character is added to the rightmost digit of the character string; a second apparatus of the plurality of apparatuses includes a second controller including a pairing acceptance processing unit that performs a pairing accepting process of displaying an acceptance string on a display device of the second apparatus and transmitting pairing acceptance information containing the displayed acceptance string to the server apparatus, the acceptance string being a character string that is input from an input device of the second apparatus based on the provision string displayed on the display device of the first apparatus; the server apparatus includes a server side controller including a pairing determination processing unit that compares the provision string contained in the pairing provision information received from the first apparatus with the acceptance string contained in the pairing acceptance information received from the second apparatus, and determines that pairing is established between the first apparatus and the second apparatus on a condition that the provision string and the acceptance string are determined to match each other; and the pairing acceptance processing unit of the second apparatus includes a carry processing unit that performs, in order to follow the changing of the provision string in the first apparatus, carrying on an acceptance string corresponding to a provision string before the changing and adds a character to the rightmost digit of the acceptance string, the character being input from the input device of the second apparatus and corresponding to the new character added to the rightmost digit of the provision string, so as to generate an acceptance string corresponding to the provision string after the changing.

Therefore, it is possible to establish pairing between apparatuses irrespective of the kinds of the apparatuses, as long as each of the apparatuses includes a display device and an input device and is connected to an information communication network.

In addition, in the system, the provision string displayed on the first apparatus is configured to change every given amount of time. Such a configuration enables the expiration of the provision string to be shortened, and thus it is possible to suppress unexpected establishment of pairing due to accidental match or by a malicious operator.

Furthermore, in the system, a provision string of a given number of digits displayed on the first apparatus is configured to change in such a manner that, every given amount of time, the provision string is subjected to carrying and a new character is added to the rightmost digit of the provision string, and the second apparatus is configured to generate an acceptance string corresponding to a provision string after the changing by performing carrying on an acceptance string corresponding to a provision string before the changing, and adding a character to the rightmost digit of the acceptance string, the character being input from the input device of the second apparatus and corresponds to the new character. Such a configuration allows, even in a case where a provision string displayed on the first apparatus changes in the course of inputting an acceptance string from the input device of the second apparatus, the completion of inputting the acceptance string corresponding to the provision string after the changing by inputting a character corresponding to the new character following the acceptance string corresponding to the provision string before the changing. Therefore, at the time of inputting an acceptance string from the second apparatus, it is possible to easily keep up with changing of the provision string in the first apparatus.

As seen from the above, the system allows establishment of pairing between apparatuses of many types connected to an information communication network, as well as suppression of establishment of unexpected pairing, and easy input of an acceptance string in the second apparatus.

In other words, the system allows pairing between apparatuses of more types connected to an information communication network, more practically.

An information communication system according to the second invention of the present application is characterized in that, in the information communication system according to the first invention of the present application, the carry processing unit of the second apparatus is configured to perform carrying on the acceptance string in synchronization with carrying of the provision string in the first apparatus.

Therefore, it is allowed in the second apparatus to immediately know that the provision string has changed in the first apparatus. This allows the acceptance string corresponding to the provision string after the changing to be immediately input.

An information communication system according to a third invention of the present application is characterized in that, in the information communication system according to any one of the first and the second inventions of the present application, the pairing determination processing unit of the server apparatus includes a re-pairing performing instruction processing unit that, when the first apparatus corresponding to a provision string that matches an acceptance string contained in the pairing acceptance information received from the second apparatus includes a plurality of first apparatuses, urges the plurality of first apparatuses to perform the pairing providing process again, and at the same time instructs the second apparatus to execute the pairing accepting process again.

Therefore, it is possible to prevent unexpected establishment of pairing due to accidental match and to establish pairing with a desired first apparatus immediately.

An information communication system according to a fourth invention of the present application is characterized in that, in the information communication system according to any one of the first to third inventions of the present application, the pairing acceptance processing unit of the second apparatus includes a confirmation string display processing unit that, on the condition that the pairing determination processing unit of the server apparatus determines that the provision string and the acceptance string match each other, displays a confirmation string on the display device of the second apparatus; the pairing provision processing unit of the first apparatus includes a response string acquisition processing unit that acquires a response string being a character string input from an input device of the first apparatus based on the confirmation string displayed on the display device of the second apparatus; and the pairing determination processing unit of the server apparatus is configured to determine that pairing is established between the first apparatus and the second apparatus on the condition that the confirmation string displayed on the display device of the second apparatus matches the response string acquired by the first apparatus.

As seen from the above, by establishing pairing on a condition that the provision string displayed on the first apparatus matches the acceptance string input from the second apparatus at the sight of the provision string, and, provided this condition is met, on a condition that the confirmation string displayed on the second apparatus matches the response string input from the first apparatus at the sight of confirmation string, it is possible to establish pairing with a desired second apparatus while preventing unexpected establishment of pairing by a malicious operator.

An information communication system according to a fifth invention of the present application is characterized in that, in the information communication system according to any one of the first to third inventions of the present application, the information communication system includes the second apparatus including a plurality of second apparatuses and is configured to establish pairing between the first apparatus and the plurality of second apparatuses.

Therefore, when there are a plurality of second apparatuses within sight of the display device of the first apparatus, pairing can be established between the first apparatus and the plurality of second apparatuses. For this reason, for example, it is possible to bring about a state allowing intercommunication in a certain group. By using a display device with a large display area, such as a screen, as the display device of the first apparatus, it is possible to handle a group of a large number of members. In addition, by using a display device capable of relay displaying as the display device of the first apparatus, it is possible to handle a member geographically located far from the first apparatus.

An information communication system according to a sixth invention of the present application serves as a system, in the information communication system according to the first to fourth inventions of the present application, that performs the authentication for making a specific service available on a precondition that pairing is established between a service apparatus and an authentication apparatus, with one of the first and the second apparatuses serving as the service apparatus, and the other serving as the authentication apparatus, the service apparatus being an apparatus that provides the specific service, the authentication apparatus being an apparatus that performs the authentication at a time of using the specific service, characterized in that the authentication apparatus includes an authentication side controller including an authentication side registering unit that generates an authentication side private key being a private key to be used by the authentication apparatus and an authentication side public key being a public key corresponding to the authentication side private key, stores the authentication side private key, and transmits the authentication side public key to the service apparatus; the service apparatus includes service side controller including a service side registering unit that, upon receiving the authentication side public key from the authentication apparatus, generates an internal user ID being an identification marker for the authentication apparatus in the specific service, stores the authentication side public key associating the authentication side public key with the internal user ID, and transmits the internal user ID to the authentication apparatus; the service side controller includes a service side encrypting unit that, upon receiving information to request authentication with the internal user ID specified, from the authentication apparatus, transmits service side encrypted data to the authentication apparatus, the service side encrypted data being data obtained by encrypting service side original data being any data prepared by the service apparatus, using the authentication side public key that corresponds to the internal user ID and is stored in the service side registering unit; the authentication side controller includes an authentication side decrypting unit that transmits service side computed data obtained by performing predetermined computation on service side decrypted data, to the service apparatus, the service side decrypted data being data obtained by decrypting the service side encrypted data received from the service apparatus, using the authentication side private key that is stored in the authentication side registering unit; and the service side controller includes an internal user ID genuineness determining unit that determines that the internal user ID is genuine when the service side computed data received from the authentication apparatus matches data obtained by performing the predetermined computation on the service side original data.

Therefore, making use of a state allowing intercommunication bringing about by pairing establishment between the service apparatus and the authentication apparatus, the authentication side public key is transmitted to and stored in the service apparatus, which allows the authentication side public key to be transmitted to and registered in the service apparatus securely and easily. In addition, making use of the state allowing intercommunication bringing about by pairing establishment, correspondence between the authentication side public key and the authentication side private key is confirmed between the service apparatus and the authentication apparatus, which allows authentication of the internal user ID to be performed by the service apparatus securely and easily. As seen from the above, by making use of pairing establishment between the service apparatus and the authentication apparatus, a public key authentication system for the authentication of the internal user ID can be easily implemented with high security. For this reason, it is possible to easily prevent spoofing by a service user.

Now, in a symmetric key authentication system performed in a conventional practice, use of a specific service (e.g., specific software) generally involves identification of a user using a user ID as well as authentication of the user using a password, so that the numbers of user IDs and passwords increase as the number of available services increases, which makes the management of them cumbersome.

In contrast, according to the present invention, an internal user ID used for identification of a user is generated in the service apparatus and transmitted to the authentication apparatus. In addition, an authentication side public key used for authentication of a user is stored in the service apparatus being associated with an internal user ID, and an authentication side private key corresponding to this authentication side public key is stored in the authentication apparatus. For this reason, when an authentication side private key is stored in an authentication apparatus, an authentication side public key is stored in each service apparatus and an internal user ID is stored in an authentication apparatus and each service apparatus for each of a plurality of services, establishment of pairing between the service apparatus and the authentication apparatus enables the authentication of the internal user ID to be automatically performed. Therefore, a user of a service using a user's authentication apparatus as a universal key (generic key) can perform authentication of an internal user ID for each service, and thereby need not remember a user ID and a password for each service as in a conventional practice.

An information communication system according to a seventh invention of the present application is characterized in that, in the information communication system according to the sixth invention of the present application, the service side registering unit further generates a service side private key being a private key to be used by the service apparatus and a service side public key being a public key corresponding to the service side private key, stores the service side private key, and transmits the service side public key together with a service ID that is an identification marker for the service apparatus in the specific service, to the authentication apparatus; upon receiving the service side public key from the service apparatus, the authentication side registering unit further stores the service side public key associating it with the service ID; the authentication side controller includes an authentication side encrypting unit that, upon receiving information to request authentication with the service ID specified, from the service apparatus, transmits authentication side encrypted data to the service apparatus, the authentication side encrypted data being data obtained by encrypting authentication side original data being any data prepared in the authentication apparatus, using the service side public key that corresponds to the service ID and is stored in the authentication side registering unit; the service side controller includes a service side decrypting unit that transmits authentication side computed data obtained by performing predetermined computation on authentication side decrypted data, to the authentication apparatus, the authentication side decrypted data being data obtained by decrypting the authentication side encrypted data received from the authentication apparatus, using the service side private key that is stored in the service side registering unit; and the authentication side controller includes a service ID genuineness determining unit that determines that the service ID is genuine when the authentication side computed data received from the service apparatus matches data obtained by performing the predetermined computation on the authentication side original data.

Therefore, making use of a state allowing intercommunication bringing about by pairing establishment between the service apparatus and the authentication apparatus, the service side public key is transmitted to and stored in the authentication apparatus, which allows the service side public key to be transmitted to and registered in the authentication apparatus securely and easily. In addition, making use of the state allowing intercommunication bringing about by pairing establishment, correspondence between the service side public key and the service side private key is confirmed between the service apparatus and the authentication apparatus, which allows authentication of the service ID to be performed by the authentication apparatus securely and easily. As seen from the above, by making use of pairing establishment between the service apparatus and the authentication apparatus, a public key authentication system for the authentication of the service ID can be easily implemented with high security. For this reason, it is possible to easily prevent spoofing by a service providing side.

Furthermore, according to the present invention, the service side public key used for performing the authentication of the service ID is associated with the service ID and stored in the authentication apparatus, and the service side private key corresponding to this service side public key is stored in the service apparatus. For this reason, when a service side private key is stored in each service apparatus, a service side public key is stored in an authentication apparatus and a service ID is stored in an authentication apparatus and each service apparatus for each of a plurality of services, establishment of pairing between the service apparatus and the authentication apparatus enables the authentication of the service ID to be automatically performed. Therefore, a user of a service using a user's authentication apparatus as a universal key (generic key) can perform authentication of a service ID for each service, and thereby can use each service securely and easily.

In addition, by making use of the public key authentication system in authentication of an internal user ID as well as authentication of a service ID, it is possible to make use of a service provided by a service apparatus more secure.

An information communication system according to an eighth invention of the present application is a system in the information communication system according to any one of the first to fourth inventions of the present application, the system performing authentication for making a specific service available, on a precondition that pairing is established between a service apparatus and an authentication apparatus, with one of the first and the second apparatuses serving as the service apparatus, and the other serving as the authentication apparatus, the service apparatus being an apparatus that provides the specific service, the authentication apparatus being an apparatus that performs the authentication at a time of using the specific service, wherein the service apparatus includes a service side controller including a service side registering unit that generates a service side private key being a private key to be used by the service apparatus and a service side public key being a public key corresponding to the service side private key, stores the service side private key, and transmits the service side public key together with a service ID that is an identification marker for the service apparatus in the specific service, to the authentication apparatus; the authentication apparatus includes an authentication side controller including an authentication side registering unit that, upon receiving the service side public key from the service apparatus, stores the service side public key associating the service side public key with the service ID; the authentication side controller includes an authentication side encrypting unit that, upon receiving information to request authentication with the service ID specified, from the service apparatus, transmits authentication side encrypted data to the service apparatus, the authentication side encrypted data being data obtained by encrypting authentication side original data being any data prepared in the authentication apparatus, using the service side public key that corresponds to the service ID and is stored in the authentication side registering unit; the service side controller includes a service side decrypting unit that transmits authentication side computed data obtained by performing predetermined computation on authentication side decrypted data, to the authentication apparatus, the authentication side decrypted data being data obtained by decrypting the authentication side encrypted data received from the authentication apparatus, using the service side private key that is stored in the service side registering unit; and the authentication side controller includes a service ID genuineness determining unit that determines that the service ID is genuine when the authentication side computed data received from the service apparatus matches data obtained by performing the predetermined computation on the authentication side original data.

Therefore, making use of a state allowing intercommunication bringing about by pairing establishment between the service apparatus and the authentication apparatus, the service side public key is transmitted to and stored in the authentication apparatus, which allows the service side public key to be transmitted to and registered in the authentication apparatus securely and easily. In addition, making use of the state allowing intercommunication bringing about by pairing establishment, correspondence between the service side public key and the service side private key is confirmed between the service apparatus and the authentication apparatus, which allows authentication of the service ID to be performed by the authentication apparatus securely and easily. As seen from the above, by making use of pairing establishment between the service apparatus and the authentication apparatus, a public key authentication system for the authentication of the service ID can be easily implemented with high security. For this reason, it is possible to easily prevent spoofing by a service providing side.

Furthermore, according to the present invention, the service side public key used for performing the authentication of the service ID is associated with the service ID and stored in the authentication apparatus, and the service side private key corresponding to this service side public key is stored in the service apparatus. For this reason, when a service side private key is stored in each service apparatus, a service side public key is stored in an authentication apparatus and a service ID is stored in an authentication apparatus and each service apparatus for each of a plurality of services, establishment of pairing between the service apparatus and the authentication apparatus enables the authentication of the service ID to be automatically performed. Therefore, a user of a service using a user's authentication apparatus as a universal key (generic key) can perform authentication of a service ID for each service, and thereby can use each service securely and easily.

As seen from the above, by making use of a state allowing intercommunication bringing about by pairing establishment between a service apparatus and an authentication apparatus, it is possible to perform authentication of a service ID that has been difficult for a general user and to easily prevent spoofing by the service providing side.

A server apparatus according to a ninth invention of the present application is a server apparatus used in the information communication system of any one of the first to eighth inventions of the present application.

Therefore, using this server apparatus in an information communication system exerts the same effect as that of any one of the above first to eighth inventions.

A first apparatus according to a tenth invention of the present application is the first apparatus used in the information communication system according to any one of the first to eighth inventions of the present application.

Therefore, using this first apparatus in an information communication system exerts the same effect as that of any one of the above first to eighth inventions.

A second apparatus according to an eleventh invention of the present application is the second apparatus used in the information communication system according to any one of the first to eighth inventions of the present application.

Therefore, using this second apparatus in an information communication system exerts the same effect as that of any one of the above first to eighth inventions.

A service apparatus according to a twelfth invention of the present application is the service apparatus used in the information communication system according to any one of the sixth to eighth inventions of the present application.

Therefore, using this service apparatus in an information communication system exerts the same effect as that of any one of the above sixth to eighth inventions.

An authentication apparatus according to a thirteenth invention of the present application is the authentication apparatus used in the information communication system according to any one of the sixth to eighth inventions of the present application.

Therefore, using this authentication apparatus in an information communication system exerts the same effect as that of any one of the above sixth to eighth inventions.

A program according to a fourteenth invention of the present application is a program for causing a computer to function as the server side controller of the server apparatus according to the ninth invention of the present application, the first controller of the first apparatus according to the tenth invention, the second controller of the second apparatus according to the eleventh invention, the service side controller of the service apparatus according to the twelfth invention, or the authentication side controller of the authentication apparatus according to the thirteenth invention.

Therefore, causing a computer to execute the program exerts the same effect as that of the above ninth to thirteenth inventions.

A recording medium according to a fifteenth invention of the present application is a recording medium in which the program according to the fourteenth invention of the present application is stored.

Therefore, causing a computer to execute the program stored in this recording medium exerts the same effect as that of the above fourteenth invention.

An information communication method according to a sixteenth invention of the present application is an information communication method that is performed using an information communication system including a plurality of apparatuses connected to an information communication network, and a server apparatus connected to the information communication network, the information communication method including: a pairing provision processing step, by a first apparatus of the plurality of apparatuses, of performing a pairing providing process of displaying a provision string on a display device of the first apparatus and transmitting pairing provision information containing the provision string to the server apparatus, the provision string being a character string of a given number of digits that is configured to change every given amount of time in such a manner that, every given amount of time, the character string is subjected to carrying and a new character is added to the rightmost digit of the character string, a pairing acceptance processing step, by a second apparatus of the plurality of apparatuses, of performing a pairing accepting process of displaying an acceptance string on a display device of the second apparatus and transmitting pairing acceptance information containing the displayed acceptance string to the server apparatus, the acceptance string being a character string that is input from an input device of the second apparatus based on the provision string displayed on the display device of the first apparatus; and a pairing determination processing step, by the server apparatus, of comparing the provision string contained in the pairing provision information received from the first apparatus with the acceptance string contained in the pairing acceptance information received from the second apparatus, and determines that pairing is established between the first apparatus and the second apparatus on a condition that the provision string and the acceptance string are determined to match each other, wherein the pairing acceptance processing step includes a carry processing step, by the second apparatus, in order to follow changing of the provision string in the first apparatus, of performing carrying on an acceptance string corresponding to the provision string before the changing, and adding a character to a rightmost digit of the acceptance string, the character being input from the input device of the second apparatus and corresponding to the new character added to the rightmost digit of the provision string, so as to generate an acceptance string corresponding to the provision string after the changing.

Therefore, using the method with a server apparatus, a first apparatus, and a second apparatus exerts the same effect as that of the first invention.

Description has been made of the preferred embodiments of the present invention. The terminology employed herein is for the purpose of illustration but not of limitation. It should be understood that many changes and modification can be made within the scope of the appended claims without departing from the scope and spirit of the present invention. Also, while only typical embodiments have been described in detail, it will be understood by those skilled in the art that various modifications may be made therein without departing from the novel teaching and advantages of the present invention. Thus, such modifications are all included in the scope of the present invention.

What is claimed is:

1. An information communication system, comprising:
a plurality of service apparatuses configured to provide a plurality of corresponding specific services, and
one authentication apparatus configured to perform an authentication at a time of using each of the specific services and to communicate with a corresponding service apparatus of the plurality of service apparatuses via an information communication means,
wherein:
the information communication system is configured to perform the authentication for making a corresponding specific service of the plurality of specific services available on a precondition that pairing is established between each service apparatus and the one authentication apparatus,
the one authentication apparatus comprises an authentication side controller comprising an authentication side registering unit configured to generate an authentication side private key to be used by the one authentication apparatus and an authentication side public key corresponding to the authentication side private key, to store the authentication side private key, and to transmit the authentication side public key to the corresponding service apparatus,
each of the service apparatuses comprises a service side controller comprising a service side registering unit that, upon receiving the authentication side public key from the one authentication apparatus, is configured to generate an internal user ID, which is an identification marker for the one authentication apparatus corresponding to the corresponding specific service and store the authentication side public key associating the authentication side public key with the internal user ID, and to transmit the internal user ID to the one authentication apparatus, such that a plurality of different internal user IDs are generated by the plurality of service apparatuses for the plurality of corresponding specific services, respectively,
the service side controller further comprises a service side encrypting unit that, upon receiving from the one authentication apparatus an authentication request with a corresponding internal user ID of the plurality of different internal user IDs specified, is configured to transmit service side encrypted data to the authentication side controller, the service side encrypted data being obtained by encrypting service side original data using the authentication side public key that corresponds to the corresponding internal user ID and is stored in the service side registering unit, the service side original data being any data prepared in the corresponding service apparatus,
the authentication side controller further comprises an authentication side decrypting unit configured to transmit to the corresponding service apparatus service side computed data obtained by performing predetermined computation on service side decrypted data, the service side decrypted data being obtained by decrypting the service side encrypted data received from the service side controller, using the authentication side private key that is stored in the authentication side registering unit,
the service side controller further comprises an internal user ID genuineness determining unit configured to determine that the corresponding internal user ID is genuine when the service side computed data received from the one authentication apparatus matches data obtained by performing the predetermined computation on the service side original data, and
the information communication system is configured such that, when the plurality of the corresponding specific services are provided, the authentication side public key for authenticating each corresponding internal user ID related to each corresponding specific service is stored in the corresponding service apparatus that provides the corresponding specific service in association with the corresponding internal user ID, and the authentication side private key corresponding to the authentication side public key is stored in the authentication apparatus, so as to provide the plurality of the specific services through the authentication of the corresponding internal user IDs utilizing the one authentication apparatus.

2. The information communication system according to claim 1, wherein:

the service side registering unit of each corresponding service apparatus is further configured to generate a service side private key being a private key to be used by the corresponding service apparatus and a service side public key corresponding to the service side private key, to store the service side private key, and to transmit the service side public key together with a service ID that is an identification marker for the corresponding service apparatus in the specific service to the one authentication apparatus, upon receiving the service side public key from the corresponding service apparatus, the authentication side registering unit is further configured to store the service side public key associating the service side public key with the service ID, the authentication side controller further comprises an authentication side encrypting unit that, upon receiving information to request authentication with the service ID specified from the corresponding service apparatus, is configured to transmit authentication side encrypted data to the corresponding service apparatus, the authentication side encrypted data being obtained by encrypting authentication side original data prepared in the one authentication apparatus, using the service side public key that corresponds to the service ID and is stored in the authentication side registering unit, the service side controller further comprises a service side decrypting unit that is configured to transmit authentication side computed data, obtained by performing predetermined computation on authentication side decrypted data, to the one authentication apparatus, the authentication side decrypted data being obtained by decrypting the authentication side encrypted data received from the one authentication apparatus, using the service side private key that is stored in the service side registering unit, the authentication side controller further comprises a service ID genuineness determining unit configured to determine that the service ID is genuine when the authentication side computed data received from the corresponding service apparatus matches data obtained by performing the predetermined computation on the authentication side original data, and the information communication system is configured such that, when the plurality of the specific services are provided, the service side public key for authenticating the service ID related to each specific service is stored in the one authentication apparatus in association with the service ID, and the service side private key corresponding to the service side public key is stored in the corresponding service apparatus providing each corresponding specific service, so as to provide the plurality of the specific services through the authentication of the corresponding service IDs utilizing the one authentication apparatus.

3. An information communication system, comprising:

a plurality of service apparatuses configured to provide a plurality of corresponding specific services, and one authentication apparatus configured to perform an authentication at a time of using each of the specific services and to communicate with a corresponding service apparatus of the plurality of service apparatuses via an information communication means, wherein:

the information communication system is configured to perform the authentication for making a corresponding specific service of the plurality of specific services available on a precondition that pairing is established between each corresponding service apparatus and the one authentication apparatus, the corresponding service apparatus comprises a service side controller comprising a service side registering unit configured to generate a service side private key to be used by the corresponding service apparatus and a service side public key corresponding to the service side private key, to store the service side private key, and to generate a service ID that is an identification marker for the corresponding service apparatus corresponding to the corresponding specific service and transmit to the one authentication apparatus the service side public key together with the service ID, such that a plurality of different service IDs are generated by the plurality of service apparatuses for the plurality of corresponding specific services, respectively, the one authentication apparatus comprises an authentication side controller comprising an authentication side registering unit that, upon receiving the service side public key from the corresponding service apparatus, is configured to store the service side public key associating the service side public key with a corresponding service ID of the plurality of different service IDs, the authentication side controller further comprises an authentication side encrypting unit that, upon receiving from each corresponding service apparatus an authentication request with the corresponding service ID specified, is configured to transmit authentication side encrypted data to the corresponding service apparatus, the authentication side encrypted data being obtained by encrypting authentication side original data using the service side public key that corresponds to the corresponding service ID and that is stored in the authentication side registering unit, the authentication side original data being any data prepared in the one authentication apparatus, the service side controller further comprises a service side decrypting unit configured to transmit to the one authentication apparatus authentication side computed data obtained by performing predetermined computation on authentication side decrypted data, the authentication side decrypted data being obtained by decrypting the authentication side encrypted data received from the one authentication apparatus, using the service side private key that is stored in the service side registering unit, and the authentication side controller further comprises a service ID genuineness determining unit configured to determine that the corresponding service ID is genuine when the authentication side computed data received from the corresponding service apparatus matches data obtained by performing the predetermined computation on the authentication side original data, and the information communication system is configured such that, when the plurality of the specific services are provided, the service side public key for authenticating each corresponding service ID related to each specific service is stored in the authentication apparatus in association with the corresponding service ID, and the service side private key corresponding to the service side public key is stored in the corresponding service apparatus providing each specific service, so as to provide the plurality of the specific services through the authentication of the corresponding service IDs utilizing the one authentication apparatus.

4. A system comprising a plurality of service apparatuses that are pairable with one authentication apparatus and configured to provide a plurality of corresponding specific services in an information communication system, each service apparatus comprising:

a service side controller, wherein the service side controller comprises a processing hardware unit configured to authenticate a user ID identifying the one authentication apparatus by:

upon receiving an authentication side public key from the one authentication apparatus, generating an internal user ID, which is an identification marker for the one authentication apparatus corresponding to a corresponding specific service of the plurality of specific services and storing the authentication side public key associating the authentication side public key with the internal user ID, and transmitting the internal user ID to the one authentication apparatus, such that a plurality of different internal user IDs are generated by the plurality of service apparatuses for the plurality of corresponding specific services, respectively, upon receiving an authentication request with a corresponding internal user ID of the plurality of different internal user IDs specified from the one authentication apparatus, transmitting service side encrypted data to the one authentication apparatus, the service side encrypted data being obtained by encrypting service side original data using the stored authentication side public key that corresponds to the corresponding internal user ID, the service side original data being any data prepared in a corresponding service apparatus of the plurality of service apparatuses, receiving service side computed data from the one authentication apparatus, the service side computed data having been obtained by decrypting the service side encrypted data to obtain service side decrypted data and performing predetermined computation on the service side decrypted data, and determining that the corresponding internal user ID is genuine when the service side computed data received from the one authentication apparatus matches data obtained by performing the predetermined computation on the service side original data, and wherein, when the plurality of the specific services are provided, the authentication side public key for authenticating each corresponding internal user ID related to each specific service is stored in the corresponding service apparatus that provides the specific service in association with the corresponding internal user ID, and the authentication side private key corresponding to the authentication side public key is stored in the authentication apparatus, so as to provide the plurality of the specific services through the authentication of the corresponding internal user IDs utilizing the one authentication apparatus.

5. The service apparatus comprising the plurality of service apparatuses according to claim 4, wherein each service apparatus is pairable with the one authentication apparatus comprising an authentication side controller, and wherein the authentication side controller comprises a processing hardware unit configured to authenticate a service ID identifying the corresponding service apparatus, by comparing a set of data that has been subject to at least one round of encryption and decryption using a pair of public and private keys associated with the corresponding service ID with the same set of data before the at least one round of encryption and decryption.

6. An information communication method for the information communication system according to claim 1 which comprises a plurality of service apparatuses configured to provide a plurality of corresponding specific services, the information communication method comprising:

an authentication side registering step, by one authentication apparatus, comprising generating the authentication side private key and the authentication side public key, storing the authentication side private key, and transmitting the authentication side public key to the corresponding service apparatus;

a service side registering step, by the corresponding service apparatus, comprising storing and associating, upon receiving the authentication side public key from the one authentication apparatus, the authentication side public key with the corresponding internal user ID, and transmitting the corresponding internal user ID to the one authentication apparatus;

a service side encrypting step, by the corresponding service apparatus, comprising transmitting, upon receiving the authentication request from the one authentication apparatus, the service side encrypted data to the one authentication apparatus;

an authentication side decrypting step, by the one authentication apparatus, comprising transmitting the service side computed data; and an internal user ID genuineness determining step, by the corresponding service apparatus, comprising determining that the corresponding internal user ID is genuine when the service side computed data received from the one authentication apparatus matches data obtained by performing the predetermined computation on the service side original data, such that the plurality of the specific services are provided through the authentication of the corresponding internal user IDs utilizing the one authentication apparatus.

7. An information communication method for the information communication system according to claim 3 which comprises a plurality of service apparatuses configured to provide a plurality of corresponding specific services, the information communication method comprising:

a service side registering step, by the corresponding service apparatus, comprising generating the service side private key and the service side public key corresponding to the service side private key, storing the service side private key, and transmitting the service side public key together with the corresponding service ID to the one authentication apparatus;

an authentication side registering step, by the one authentication apparatus, comprising, upon receiving the service side public key from the corresponding service apparatus, storing and associating the service side public key with the corresponding service ID, an authentication side encrypting step, by the one authentication apparatus, comprising transmitting, upon receiving the authentication request from the corresponding service apparatus, the authentication side encrypted data to the corresponding service apparatus;

a service side decrypting step, by the corresponding service apparatus, comprising transmitting the authentication side computed data to the one authentication apparatus; and a service ID genuineness determining step, by the one authentication apparatus, comprising determining that the corresponding service ID is genuine when the authentication side computed data received from the corresponding service apparatus matches data obtained by performing the predetermined computation on the authentication side original data, such that the plurality of the specific services are provided through the authentication of the corresponding service IDs utilizing the one authentication apparatus.

8. A non-transitory computer-readable medium storing a program that, when executed by a computer, performs the information communication method according to claim 6.

9. A non-transitory computer-readable medium storing a program that, when executed by a computer, performs the information communication method according to claim 7.

* * * * *